(12) United States Patent
Denniss

(10) Patent No.: US 12,146,464 B2
(45) Date of Patent: Nov. 19, 2024

(54) APPARATUS AND METHOD FOR EXTRACTING ENERGY FROM A FLUID

(71) Applicant: Wave Swell Energy Limited, Hornsby (AU)

(72) Inventor: Thomas Denniss, Hornsby (AU)

(73) Assignee: Wave Swell Energy Limited (AU)

( * ) Notice: Subject to any disclaimer, the term of this patent is extended or adjusted under 35 U.S.C. 154(b) by 0 days.

(21) Appl. No.: 18/020,260

(22) PCT Filed: Aug. 9, 2021

(86) PCT No.: PCT/IB2021/057346
§ 371 (c)(1),
(2) Date: Feb. 7, 2023

(87) PCT Pub. No.: WO2022/029748
PCT Pub. Date: Feb. 10, 2022

(65) Prior Publication Data
US 2023/0323849 A1    Oct. 12, 2023

(30) Foreign Application Priority Data

Aug. 7, 2020  (AU) ................................ 2020902794

(51) Int. Cl.
*F03B 13/14* (2006.01)
*F03B 11/00* (2006.01)
*F03B 13/24* (2006.01)

(52) U.S. Cl.
CPC .......... *F03B 13/142* (2013.01); *F03B 11/004* (2013.01); *F03B 13/14* (2013.01);
(Continued)

(58) Field of Classification Search
None
See application file for complete search history.

(56) References Cited

U.S. PATENT DOCUMENTS

| 4,189,918 A | 2/1980 | Moody et al. |
| 4,564,312 A | 1/1986 | Saiz |

(Continued)

FOREIGN PATENT DOCUMENTS

| CA | 2499018 A1 | 9/2006 |
| CA | 2819701 A1 | 6/2011 |

(Continued)

*Primary Examiner* — Juan G Flores
(74) *Attorney, Agent, or Firm* — Morriss O'Bryant; Compagni Cannon, PLLC.

(57) ABSTRACT

Apparatus for extracting energy from an oscillating working fluid, the apparatus comprising a flow passage 40 for the oscillating working fluid, an energy conversion unit 44 and a flow control device 38, each of the energy conversion unit 44 and the flow control device 38 being, at least in part, in fluid communication with the flow passage 40, wherein in use the flow control device 38 is selectively operable between a first configuration in which the flow control device 38 is open to allow a flow of the oscillating working fluid to exit the flow passage therethrough, and a second configuration in which the flow control device 38 is arranged to restrict a flow of the working fluid therethrough, such that the oscillating working fluid enters the flow passage via the energy conversion unit 44.

26 Claims, 13 Drawing Sheets

(52) U.S. Cl.
   CPC ........ *F03B 13/24* (2013.01); *F05B 2210/404* (2013.01); *F05B 2250/02* (2013.01); *F05B 2270/202* (2020.08); *F05D 2220/32* (2013.01)

(56) References Cited

U.S. PATENT DOCUMENTS

| | | |
|---|---|---|
| 4,741,157 A | 5/1988 | Nishikawa |
| 6,935,808 B1 | 8/2005 | Dempster |
| 10,161,379 B2 * | 12/2018 | Nanehkaran ............... E02B 9/08 |
| 11,644,004 B2 * | 5/2023 | Denniss ................ F03B 13/142 |
| | | 417/330 |
| 2008/0175667 A1 | 7/2008 | Liou |
| 2014/0183122 A1 | 7/2014 | Canals et al. |
| 2016/0273512 A1 * | 9/2016 | Nanehkaran ............... E02B 9/08 |
| 2020/0056577 A1 * | 2/2020 | Denniss ................ F03B 13/142 |

FOREIGN PATENT DOCUMENTS

| | | |
|---|---|---|
| CN | 105003384 A | 10/2015 |
| EP | 2123903 A1 | 11/2009 |
| EP | 3483423 A1 | 5/2019 |
| GB | 2429243 A | 2/2007 |
| GB | 2439643 A | 1/2008 |
| GB | 2522697 A | 8/2015 |
| JP | S52006849 A | 1/1977 |
| JP | S60215907 A | 10/1985 |
| JP | S63198782 A | 8/1988 |
| JP | 2010507041 A | 3/2010 |
| WO | 2015173235 A1 | 11/2015 |
| WO | 2018071963 A1 | 4/2018 |

* cited by examiner

APPARATUS AND METHOD FOR EXTRACTING ENERGY FROM A FLUID

CROSS-REFERENCE TO RELATED APPLICATIONS

This application is a U.S. national stage filing under 35 U.S.C. § 371 of International application PCT/IB2021/057346, filed Aug. 9, 2021, and claims priority to Australian Application number 2020902794, filed Aug. 7, 2020, the entire contents of both of which are incorporated herein by reference.

TECHNICAL FIELD

This disclosure relates generally to energy generation and more particularly, but not exclusively, to energy generation using ocean wave energy extraction systems. The disclosure is concerned with the design of the apparatus as well as methods for optimising the capture of energy from such apparatus.

BACKGROUND OF THE DISCLOSURE

Numerous types of wave power generation systems have been proposed in the art. Such systems are based on the principle of using the motion of waves to cause a rotary movement of a turbine to drive a generator to produce electricity. Known wave power generation systems employ one or more fluid flow ducts for containing oscillating water columns (OWC) connected to a turbine. In such systems there is frequently reversing air flow conditions present caused by displacement of the air in a duct, as a result of the oscillatory motion of the waves in the OWC caused by inward and outward flows of waves. These turbines often have the disadvantage that they are complex in configuration and expensive to manufacture, and cannot withstand the harsh environmental conditions (salt water, high or rough seas bringing large or unpredictable forces) over long periods of time. Many of these prior systems operate at low efficiency due to losses when converting the motion of the OWC into rotational mechanical energy in the bidirectional turbines.

There is a need for an improved system design which can capture energy from OWC in an efficient manner, and which can lower the costs of performing such a task.

SUMMARY

In a first aspect, embodiments are disclosed on an apparatus for extracting energy from an oscillating working fluid, the apparatus comprising a flow passage for the working fluid, a turbine and a flow control device, each of the turbine and the flow control device being in direct fluid communication with the flow passage, wherein in use the flow control device is selectively moveable between a first configuration in which the flow control device is open to allow a flow of the working fluid to exit the flow passage therethrough, and a second configuration in which the flow control device restricts a flow of the working fluid therethrough, such that the working fluid enters the flow passage via the turbine.

In certain embodiments, the flow control device changes the configuration of access to the flow passage in response to changes in the pressure and/or direction of flow of the oscillating working fluid.

In certain embodiments, the flow control device is fully closable so as to facilitate the flow of working fluid solely via the turbine in the second configuration.

In certain embodiments, the flow control device operates passively in its movement between the first and second configurations. In one form of this, the flow control device has an element which is moveable to become open and closed to the flow of working fluid. In a particular form of this, the element is hingedly moveable, and is of a shape which covers a cross-sectional opening passage of the flow control device.

In certain embodiments, the flow control device is made of a deformable elastomeric material.

In certain embodiments, the turbine includes a rotor comprising a central hub and a plurality of blades arranged about and extending from the periphery of the hub, the rotor disposed within a housing connected to the flow passage, whereby the shape of the blades and their orientation in relation to the hub facilitates unidirectional rotation of the turbine rotor in response to a unidirectional axial flow of working fluid through the housing. In one form of this, an electric generator is configured for rotation by the turbine to generate electrical energy. In one particular embodiment, a drive shaft is coupled to the hub at its proximal end and to the electric generator at its distal end.

In certain embodiments, the working fluid is air, and the flow of the air is generated by oscillations of an oscillating water column which is in fluid communication with the flow passage, and which is located in a duct.

In certain embodiments, the duct comprises: (a) a first portion arranged in use to be substantially submerged below the mean surface level (MSL) of a body of water in which it is located, the first portion having an opening arranged for receiving an incoming wave from the body of water, and (b) a second portion which depends from the first portion and which is arranged in use to extend above the MSL, the second portion for receiving water from the incoming wave after it flows through the first portion, wherein the flow passage is defined by a region of the second portion which extends above a maximum level of water received from the incoming wave after it flows through the first portion.

In one form of this, the first and second portions of the duct are joined via a flow direction control segment intermediate the first and second portions, the flow direction control segment is defined by a planar sloped portion arranged at the junction of and extending between the first and second portions.

In one particular embodiment, the first and second portions of the duct are generally elongate conduits, the first portion having a cross-sectional area greater than the cross-sectional area of the second portion. In one form of this, the cross-sectional area at the opening of first portion is of a greater cross-sectional area than the remainder of the first portion, the conduit tapering down in cross-sectional area when moving in a direction from an outer entry mouth region at the opening toward the second portion, so as to accelerate the flow of incoming waves from the body of water into the duct. In one particular embodiment, the outer entry mouth region of the first portion is arranged in use to extend above the MSL of a body of water in which it is located, so as to capture a greater flow of incoming waves from the body of water into the duct.

In certain embodiments, the duct is operable to rest on the floor of the body of water in which it is disposed.

In a second aspect, embodiments are disclosed of a wave energy extraction system, the system including:

(a) at least one duct for receiving an oscillating water column, the duct comprising: (i) a first portion arranged in use to be substantially submerged below the mean surface level (MSL) of a body of water in which it is located, the first portion having an opening arranged for receiving an incoming wave from the body of water, and (ii) a second portion which depends from the first portion and which is arranged in use to extend above the MSL, the second portion for receiving water from the incoming wave after it flows through the first portion, such that in use an oscillating water column is established within the duct as a result of repeated movement of water into and out of the duct, the flow of water out of the duct also being via the opening, but in a direction opposite to the direction of the incoming wave;

(b) a rotatable air turbine which is in direct fluid communication with a flow passage located within the second portion of the duct; and (c) at least one flow control device which is also in direct fluid communication with the said flow passage, the flow control device being arranged in use to move between a first configuration in which the device is open, allowing a flow of displaced air to exit the flow passage when the oscillating water column is received into the second portion of the duct, and then to a second configuration in which the device restricts air flowing into the second portion, whereupon, as the oscillating water column flows out of the duct in the said opposite direction, a flow of air is drawn back into the flow passage via the rotatable air turbine.

In certain embodiments, the flow control device changes the configuration of access to the second portion in response to changes in the pressure and/or direction of flow of the oscillating working fluid.

In certain embodiments, the system further includes an electric generator configured for rotation by the turbine to generate electrical energy. In one form of this, the turbine includes a rotor comprising a central hub and a plurality of blades arranged about and extending from the periphery of the hub, the rotor disposed within a flow passage connected to the second portion, whereby the shape of the blades and their orientation in relation to the hub facilitates unidirectional rotation of the turbine rotor in response to axial air flow through the flow passage into the second portion. In one particular form of this, a drive shaft is coupled to the hub at its proximal end and to the electric generator at its distal end.

In certain embodiments, the frequency of the oscillating water column in use can be varied by changing the cross-sectional area of the flow control device(s) as a proportion of the surface area of the second portion which extends above the MSL, by the selective movement of one or more of the flow control device(s) between the first and second configurations. In one form of this, the cross-sectional area of the flow control device(s) as a proportion of the surface area of the second portion which extends above the MSL, is arranged to be less than 15 percent. In a particular form of this, the said proportion is arranged to be less than 10 percent.

In certain embodiments, the system of the second aspect includes the apparatus as defined in the first aspect.

In a third aspect, embodiments are disclosed of a duct for receiving an oscillating water column, the duct comprising:
(a) a first portion arranged in use to be substantially submerged below the mean surface level (MSL) of the body of water in which it is located, the first portion comprising a conduit having an opening arranged for receiving the incoming wave from the body of water, and (b) a second portion comprising a further conduit which depends from the first portion and which is arranged in use to extend above the MSL, the second portion for receiving water from the incoming wave after it flows through the first portion, wherein an entry mouth at the opening of the first portion is arranged in use to partially extend above the MSL of a body of water in which it is located, so as to capture a greater flow of incoming waves from the body of water into the duct.

In certain embodiments, the first portion has a greater cross-sectional area at the opening than the remainder of the first portion, the conduit tapering down in cross-sectional area when moving in a direction from the entry mouth at the opening toward the second portion, so as to accelerate the flow of incoming waves from the body of water into the duct. In one form of this, the uppermost and outermost in use region of the entry mouth of the first portion is arranged in use to partially extend above the MSL of the body of water.

In one particular form, an uppermost surface of the first portion slopes downwardly when moving in a direction from the entry mouth at the opening toward the second portion.

In certain embodiments, the duct of the fourth aspect is otherwise as defined in the first aspect.

In a fourth aspect, embodiments are disclosed of apparatus for extracting energy from an oscillating working fluid, the apparatus including: a housing defining a flow passage for the working fluid; an energy conversion unit disposed at the housing, in fluid communication with the working fluid in the flow passage in use; and a flow control means which is in fluid communication with the flow passage, in use for selectively changing the configuration of the flow passage between an active configuration in which the working fluid acts on the energy conversion unit, and a bypass configuration in which the working fluid bypasses the energy conversion unit.

In certain embodiments, in use the flow control means and the energy conversion unit are configured to operate sequentially such that a flow of working fluid exits the flow passage via the flow control means, and a flow of working fluid enters the flow passage via the energy conversion unit.

In certain embodiments, the housing is arranged to contain an oscillating water column located adjacent the sea, and the direction of the working fluid acting on the energy conversion unit is associated with the fall of a passing wave.

In certain embodiments, the energy conversion unit includes a turbine rotor.

In certain embodiments, the apparatus of the fifth aspect is otherwise as defined in the first aspect.

In a fifth aspect, embodiments are disclosed of a method of extracting energy from an oscillating working fluid, the method including the steps of:
  (i) positioning a housing at least partially in a body of water having waves, the housing defining a flow passage for receiving the oscillating working fluid;
  (ii) arranging an energy conversion unit to be in fluid communication with the oscillating working fluid; and
  (iii) providing flow control means for selectively changing the configuration of the flow passage between an active configuration such that the working fluid acts on the energy conversion unit when flowing in a first predetermined direction, and a bypass configuration in which the working fluid bypasses the energy conversion unit when flowing in a second direction.

In a sixth aspect, embodiments are disclosed of a method for locating an oscillating wave column energy capture device at an offshore location in a body of water, the method including the steps of:

(i) arranging a closure which in use prevents the ingress of water into an interior chamber of the device, and fitting the device itself with at least one buoyancy tank as a flotation aid;

(ii) causing the device to become floated on the body of water;

(iii) moving said device to a pre-determined location in the body of water;

(iv) causing the removal of the closure, and thus its separation from the device; and (v) causing the flooding of the or each buoyancy tank so that the device can become partially submerged and rest on the floor of the body of water at the pre-determined location for its intended operational use.

In certain embodiments, the energy capture device is otherwise as defined in the first or fourth aspects.

In this Summary and throughout the specification, the abbreviation MSL is used for "mean surface level" or "mean sea level", and is defined as the mid-point between a mean low and a mean high tide in a body of water at a particular location. MSL therefore means an average level of the surface of a particular body of water, and thus also represents a vertical depth datum point from which variations in wave crests or troughs can be measured.

Aspects, features, and advantages of this disclosure will become apparent from the following detailed description when taken in conjunction with the accompanying drawings, which are a part of this disclosure and which illustrate, by way of example, principles of any inventions disclosed.

DESCRIPTION OF THE FIGURES

The accompanying drawings facilitate an understanding of the various embodiments which will be described.

DETAILED DESCRIPTION

This disclosure relates to the features of an apparatus for extracting energy from an oscillating working fluid, for example ocean waves repeatedly entering and leaving the apparatus in use. The disclosure also relates to the features of the apparatus which maximise the capture of the incoming waves. The disclosure also relates to a method of operating and controlling the apparatus to maximise the quantity of energy generated. The apparatus has a design which enables greater energy generation per unit flow of fluid than known techniques in this field.

Figure 1:
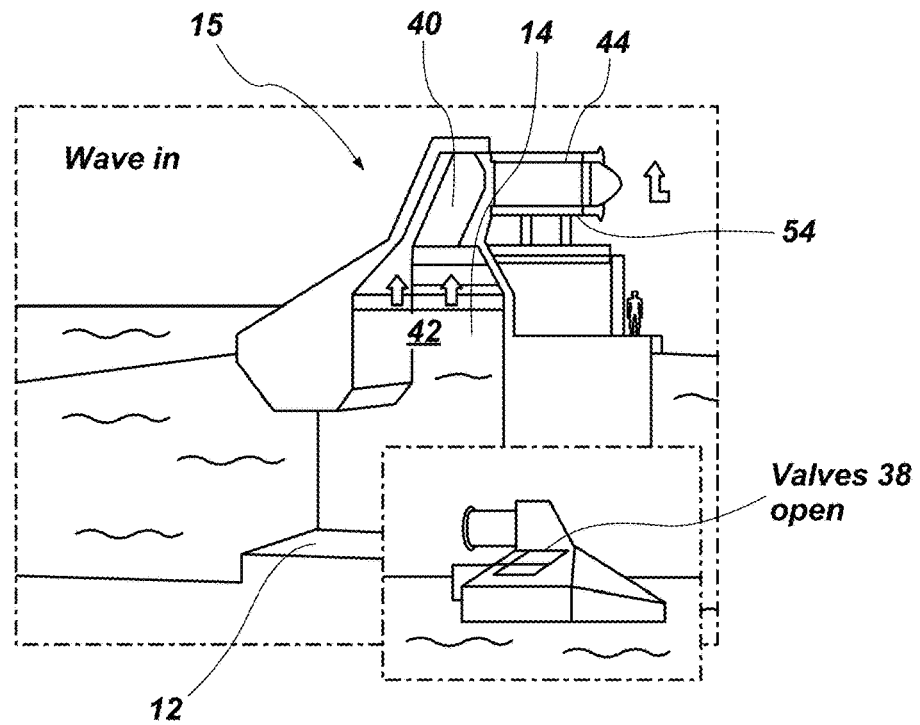
FIG. 1 is a side, cross-sectional view of an apparatus for extracting energy from an oscillating fluid, such as a wave from a body of water, in accordance with a first embodiment of the present disclosure where there is a condition of an incoming wave.
Figure 2:
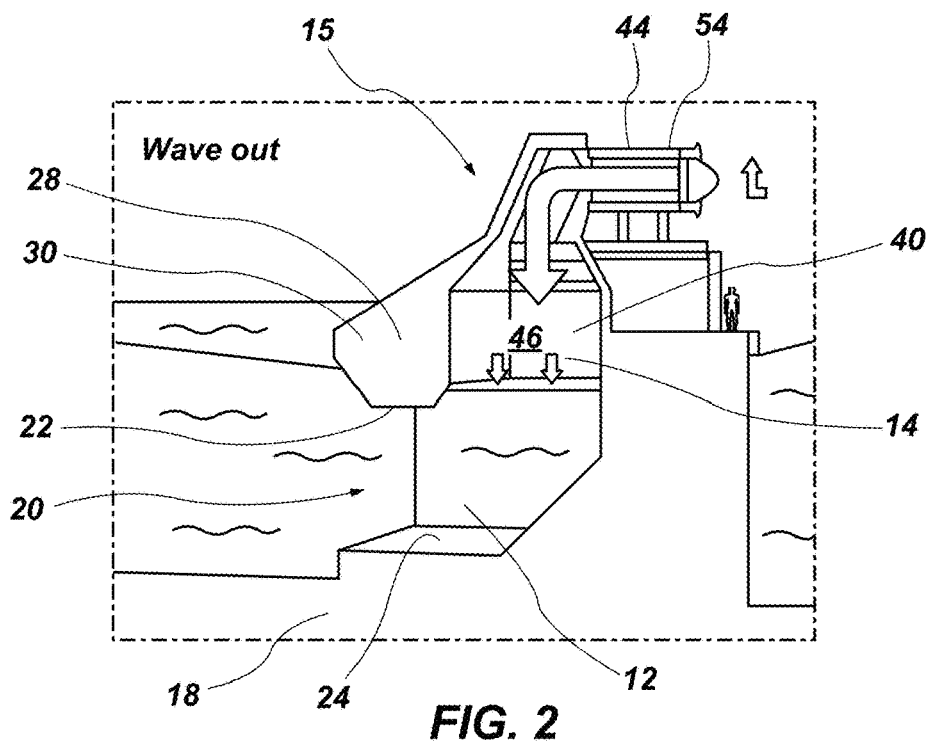
FIG. 2 is the same view as FIG. 1, showing a condition of an outgoing wave.

Referring to the drawings, the apparatus shown in FIGS. 1 and 2 comprises a housing 15 which defines an interior conduit or duct 10 comprising two arm portions 12, 14, each arm portion comprising an elongate conduit which is generally rectangular in cross-section and arranged orthogonally to one another and connected in a generally L-shaped configuration, when the duct 10 is viewed from the side. (In further embodiments, like parts are given like part numerals for ease of reference in this description).

The first conduit 12 of the duct 10 is arranged in use to be substantially submerged below the mean surface level (MSL) of a body of water 16 in which it is located, for example to rest on the sand and rock base at an ocean shoreline, and oriented with its elongate axis oriented generally orthogonal to the shoreline, and in some embodiments, approximately horizontally aligned with the sand and rock base of the seabed. In use, the duct 10 forms the structure which will house an oscillating water column (OWC), that is generated in response to repeated movement in the body of water 16 in which it is submerged.

Figure 3:
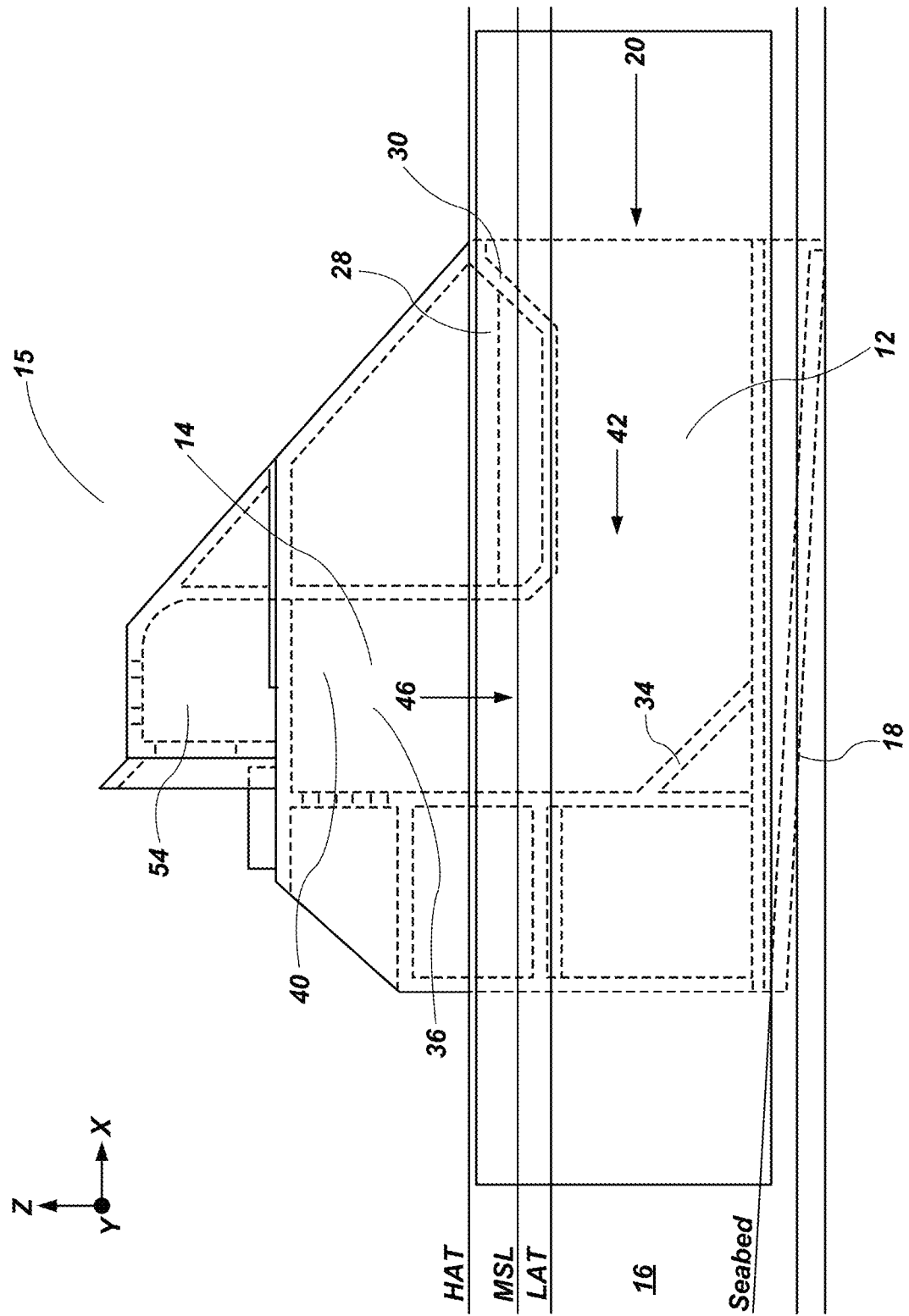
FIG. 3 is a cross-sectional view of the apparatus shown in FIGS. 1 and 2 with the apparatus is phantom line illustrating orientation for placement in use.

The first conduit 12 has a rectangular-shaped opening mouth 20 which is arranged for receiving an incoming wave flowing in from the body of water 16, the mouth 20 being oriented outwardly into the body of water which is the source of the waves, for example an ocean, sea or lake. As shown in FIG. 3 in dotted outline cross-section, and also for example in FIG. 4, the cross-sectional area of the mouth 20 is greater in area than at any point in the rest of the first conduit 12, because the first conduit 12 tapers down in cross-sectional area when moving in a direction from the mouth opening 20 inwardly into the interior of the first conduit 12 of the duct 10 and towards the second conduit 14. The effect of a general tapering of this solid-walled first conduit 12 is to accelerate the flow of incoming waves from the body of water 16 into the duct 10, for reasons which will become apparent when an oscillating flow is created in use.

In some embodiments the upper wall 22 of the first conduit 12 can be partially sloped downwardly and is angled towards the flat base floor 24, which rests on the sand and rock base, in use. Vertical side walls 26 extend between the flat base floor 24 and the upper wall 22 of the first conduit resulting in a tapering region of the first conduit 12. In yet further embodiments, the first conduit may comprise a sloped upper wall over its entire length, along with a flat base floor 24 and with vertical side walls 26 extending therebetween. In another embodiment, the first conduit can have an upper wall and a base floor which are both sloped inwardly towards one another over some of the length of the conduit 12, when moving in a direction from the opening mouth 20 inwardly into the duct 10. In yet another embodiment, the side walls of the first conduit can also be angled to taper inwardly, to form a conduit with a narrowing width so that it has a cross-sectional area which reduces when moving in a direction from the opening mouth 20 inwardly into the duct.

In the embodiment shown in FIG. 3, the outermost and uppermost region 28 of the mouth 20 of the first conduit 12 is arranged in use to extend above the MSL of the body of water 16 in which it is located, to form a wave-piercing lip 30 of the mouth 20. This feature can help to capture and channel a greater flow of incoming waves from the body of water 16 into the duct 10, particularly if the motion of the body of water is rough or choppy.

The second conduit 14 of the duct 10 is arranged in use to substantially extend above the MSL of the body of water 16 in which it is located, oriented with its elongate axis being generally perpendicular to that of the first conduit 12. The second conduit 14 is elongate and extends from the first conduit 12, and is arranged for receiving water from the incoming wave after it has flowed through the first conduit 12. After an incoming wave flows through the first conduit 12 and into the second conduit 14 of the duct 10, it is then free to flow back out of the second conduit 14, via the first conduit 12, and to return to the body of water 16, thereby setting up an oscillating water flow (or oscillating water column, OWC) in the duct 10 which can be arranged to match the incoming and outgoing flow of the waves at the shoreline of the body of water 16. The second conduit 14 extends to a height above a maximum level of water received from the incoming wave after it flows through the first conduit 12. A volume of gas (typically air) which is located above that maximum level of water becomes a 'working fluid', which is displaced out of, and then drawn back into, the uppermost region of the second conduit 14 as will shortly be described.

To assist with an oscillating water flow, the dimensions of the interior of the duct 10 at the transition surface where the conduits 12, 14 are joined up, are the same. The first 12 and second 14 conduits also have a flow direction control segment in the form of a planar sloped portion 34 arranged at the junction of the two conduits 12, 14, which facilitates the flow of incoming water to be able to turn from a horizontal axial flow to a vertical axial flow orientation within the duct 10, and subsequently from a vertical axial flow to a horizontal axial flow orientation when the water oscillates in the reverse direction and flows outwardly from the duct 10, and back towards the body of water 16. If the cross-sectional area of first conduit 12 becomes narrower as the fluid progresses into the duct 10, the fluid velocity will increase, which in turn can drive the fluid column formed within the duct 10 to oscillate more quickly.

The uppermost region 36 inside the second conduit 14, which lies above the maximum level of water as it is received from the incoming wave, defines a flow passage 40 which contains a displaceable volume of air. In use, that volume of air can exit the uppermost region 36 via a number of flow control devices fitted to side wall openings 41, the devices operating effectively as one-way valves in the form of openable flaps 38, said flaps being arranged to be moved into an open configuration so that the air can pass through them and out of the flow passage 40. The flow passage 40 is also in fluid communication with a unidirectional turbine 44 which is rotatably mounted into a hollow, trapezoidal-shaped, rotor housing 54 which is positioned at an uppermost surface of the second conduit 14. In the embodiments shown herein, the openable flaps 38 and the turbine 44 are in direct fluid communication with the flow passage 40, meaning that air movement from the atmosphere into and out of the flow passage 40 does not pass through a valve or other flow restrictor before it reaches the turbine 44, or the openable flaps 38, or vice versa. In other words, the openable flaps 38 and the turbine 44 are not arranged in series with one another, but rather are arranged in a parallel operational configuration with one another, being positioned at discrete, spaced-apart, access openings 41 in the walls of the second conduit 14, which directly access the flow passage chamber 40, inside that second conduit 14. Such a configuration of the flow passage 40, means that the working fluid (such as air) can act unidirectionally on the turbine, or alternatively when operated in a bypass configuration (that is, bypassing the turbine), the working fluid can flow unidirectionally and exit or discharge the via the openings 41 and the openable flaps 38. At an uppermost end of the flow passage 40, these deformable flaps 38 and the turbine 44 are located above the normal operating water level of the sea, lake or other body of water when pushed upward into the second conduit 14, as will be described.

In use, as a wave moves toward the duct 10, the narrowing cross-sectional area of the first conduit 12 serves to guide the incoming wave into the duct 10. The wave moves through the duct 10 in the direction of the arrows 42, and some amount of the air in the flow passage 40 in the uppermost region 36 is displaced by the vertically rising water in the duct 10, and flows out of the one-way valves which are present in the form of openable flaps 38, such that the air which is displaced is discharged to the atmosphere during that upstroke interval (i.e. the period when the wave passes into the duct 10). The aim of the openable flaps 38 is to minimize the positive pressure build up during the upstroke interval in the flow passage 40.

The deformable flaps 38 are arranged to be of a suitable weight and elasticity to move passively in response to the movement of air, so that the flow of air under positive pressure out of the flow passage 40 is sufficient to open them, and to offer a path of least resistance out of the duct 10 of the OWC entirely, rather than the potential alternative of any significant quantity of air being able to leave the flow passage 40 via the only other fluid flow opening that is connected thereto, being the rotor housing 54 in which the unidirectional turbine 44 is located.

The one-way flaps 38 have materials of construction which allow them to be sufficiently easily openable, on a repeated basis, in a passive manner in response to a pressure increase within the flow passage 40, as well as being a very low maintenance item in a salt-water environment. In one form, the flaps 38 comprise a pair of rubber or elastomeric sheets, arranged to be aligned face to face adjacent with one another, and having a layer of thin metallic mesh located in between the two aligned elastomeric sheets to provide reinforcement of the planar shape to prevent folding or curling, and well as to provide strength resistance to tearing or piercing. The assembly of rubber sheets and mesh together creates a deformable flap 38, and in use that flap is fastened along its uppermost in use side edge onto an exterior wall of the second conduit 14, said flap being arranged to be of a suitable size to obstruct one of the discrete, spaced-apart access openings 41 located in the uppermost region of the outer wall of the second conduit 14, and which directly access the flow passage chamber 40 that is located inside.

Figure 11B:
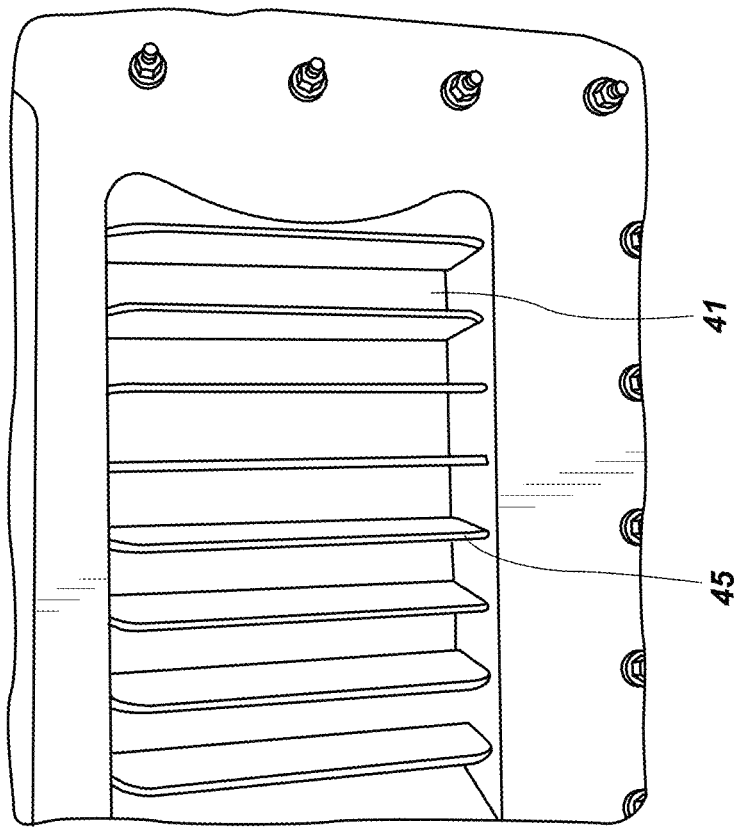
FIGS. 11A and 11B are front views of a rectangular metal frame, which supports spaced apart metal bars, and which is inset into a rectangular opening in the exterior wall of the second conduit of the apparatus in accordance with the embodiment shown in FIG. 5C.
Figure 11A:
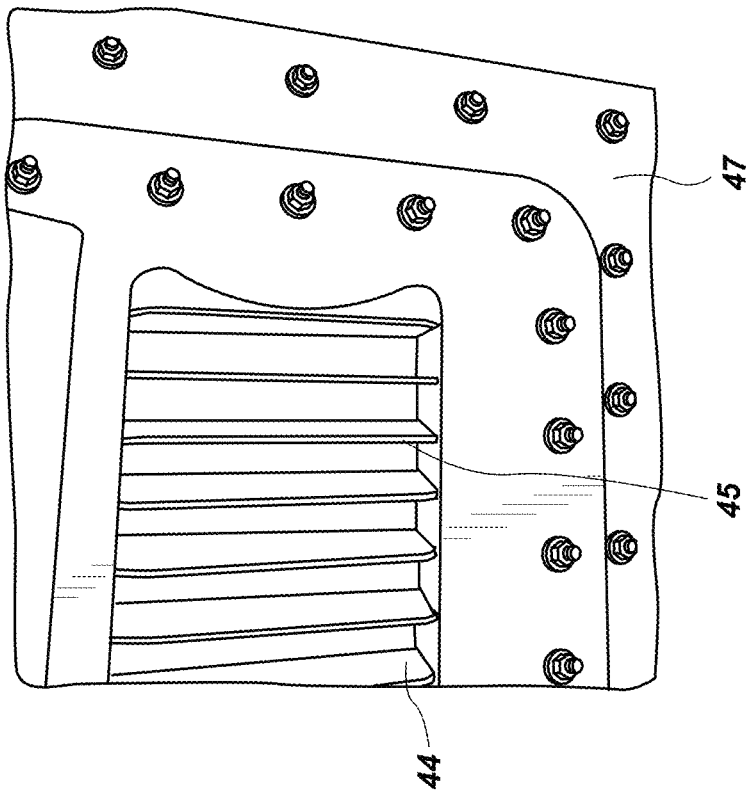
Figure 12B:
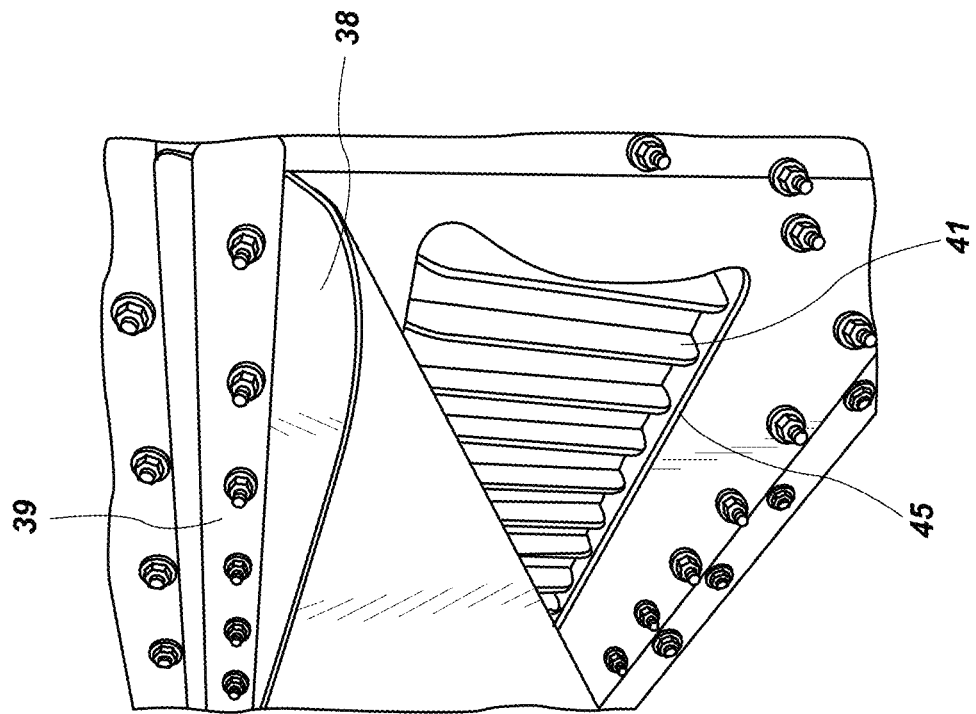
FIGS. 12A and 12B are perspective views of the rectangular metal frame shown in FIGS. 11A and 11B.
Figure 12A:
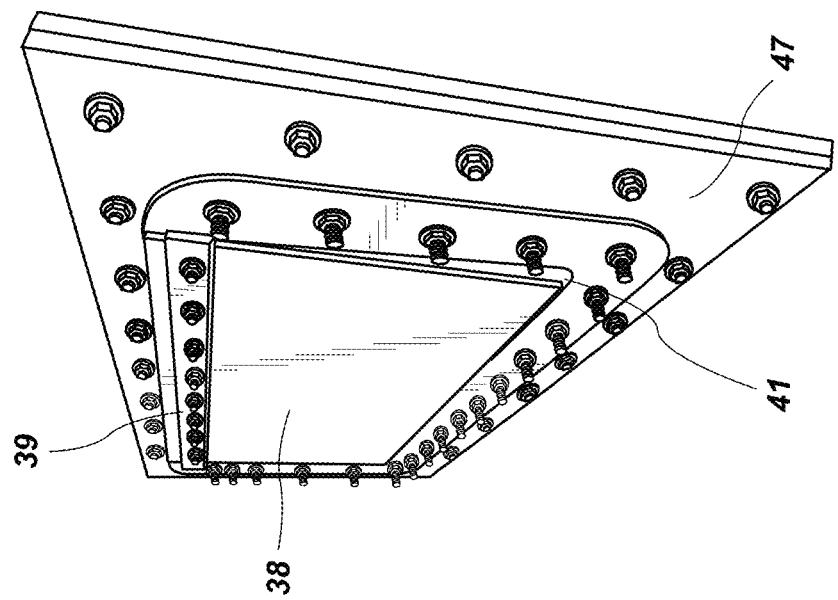

Each deformable flap 38 can be fastened to the exterior wall of the second conduit 14 by using stainless steel nuts and bolts 39 or screws the like, for survival in a corrosive environment. Additionally, at each access opening 41 which each respective flap 38 is arranged to cover, there can also be a flap support fitted in the form of a grille, mesh, or series of bars, made of metal or ceramic or the like, arranged to extend across the height or the width of the opening 41, and which are also arranged in use to be seated flush with the exterior wall surface 47 of the second conduit 14. For example, the vertical metal plates 45 shown in FIGS. 11A, 11B and 12B are spaced laterally apart from one another over the horizontal width of the opening 41, thus forming a grille which provides a rigid supporting structure which both freely allows the passage of air when the deformable flap 38 is moved into the open configuration, and against which the deformable flap 38 is seated in a close-facing relationship when in a closed configuration (the 'at rest' position as shown in FIG. 12A), so that atmospheric air cannot pass through the opening 41 and into the flow passage 40.

As a wave moves into the interior of the flow passage 40 (the period of wave "upstroke"), the working fluid (typically air) in the interior is compressed and its pressure increases, until it is expelled from the flow passage 40 into the atmosphere outside of the via the side wall openings 41 and past the one-way deformable flaps 38, which become displaced outwardly from the exterior wall of the duct 40, leading to the atmosphere. This path of air expulsion bypasses the other potential exit route for a gas from the flow passage 40, being via the wall opening into the rotor housing 54 in which the turbine 44 is rotatably mounted.

When the wave then moves back out of the duct 10 via the mouth 20 and towards the body of water 16 in the direction of the arrows 46 (the period of wave "downstroke"), it is in a direction opposite to the direction 42 of the incoming wave. As a result of the flow in the outward direction 46, atmospheric air is drawn into the flow passage 40 in the uppermost region 36 by a suction pressure created by the departing water. Because the one-way valves as deformable flaps 38 are now in the fully closed configuration, in which the flaps are drawn towards and tightly seated against the grille, mesh or bars, so that atmospheric air cannot pass through them, the flow of air drawn into the flow passage 40 in response to the suction pressure can only be drawn in through the unidirectional turbine 44, and this flow of air thus causes the turbine 44 to rotatably turn so as to generate electrical energy.

In operation, the turbine 44 is arranged for continuous, unidirectional rotation on low friction or frictionless bearings. It experiences periods of accelerated rotation on the wave downstroke when, as a wave moves out of the interior flow passage 40 of the duct 10 (that is, in the opposite direction to the upstroke), a region of low pressure (or partial vacuum) is created in the flow passage 40. That low pressure causes a flow of the working fluid (air) to be drawn thereinto, to achieve pressure equalisation. That air flow enters the flow passage 40 solely via the turbine housing 54 in which the turbine 44 is rotatably mounted. There is no possible flow path inwardly into the flow passage 40 via the deformable flaps 38, which can only be displaced or deformed outwardly. When placed under suction by the lowering of pressure in the flow passage, those flaps 38 will be drawn against the supporting metal bars or grille at the opening which the flap 38 covers, but because of the rigidity of its (square or rectangular) planar shape, the body of the deformable flap 38 will not retract into the flow passage 40, nor allow atmospheric air to enter the flow passage 40 at that time. As shown in detail in FIG. 11A and FIG. 12A, the rectangular metal frame which supports the metal bars or grille is inset into a complementary-sized rectangular opening 41 in the exterior wall of the second conduit 14. The frame has a front flange which extends around and depends laterally from each side perimeter of the frame so that, in position, the front flange is aligned parallel to, extending alongside, and flush with, the exterior wall surface which surrounds the perimeter of the rectangular opening. The flange is mounted to that exterior wall surface by a series of screws which are positioned in aligned through-holes arranged in both the front flange and in the exterior wall of the second conduit 14.

When the pressure has equalised in the central chamber, the rate of motion of air drawn thereinto slows to a halt, which means that the rotational speed of the unidirectional turbine 44 also slows down until it reaches its inertial speed of rotation, achieved when it is mounted on low friction or frictionless bearings, and continues to rotate at that speed. Then, upon the next upstroke when a further wave moves into the duct 10, the same cycle then repeats.

The unidirectional rotation of the turbine 44, whether moving at higher rotational speeds, with air being drawn therethrough to flow into the low pressure region in the flow passage 40, or simply moving at its inertial speed of rotation, will ultimately create a slightly positive flowrate (and pressure) of air into the flow passage at the end of the downstroke. It also means that on the next upstroke, when a further wave moves into the interior of the duct 10 and the working fluid (air) therein starts to compress, the net flowrate of air passing into the flow passage 40 via the operation of the constantly rotating turbine 44 will run counterflow to the possible expulsion of any compressed air from the flow passage 40 out to the atmosphere via the turbine 44 or the turbine housing 54. Consequently, compressed air from the flow passage 40 is only expelled to the atmosphere outside of the duct 10 via the deformable flaps 38, not via the turbine conduit.

The work of the inventor has established that it is significantly energy inefficient to operate an oscillating water column to generate electricity in a configuration where when the wave moves into the duct 10, the air in the flow passage 40 is displaced to flow out of the unidirectional turbine 44, and so as to be discharged to the atmosphere, and in the return cycle when the wave moves out of the duct 10 via the mouth 20 and towards the body of water 16, atmospheric air is then drawn back into the flow passage 40 via some kind of wall openings back into the flow passage 40. Based on his extensive work, the inventor has shown that it is during the downstroke of air suction into the flow passage 40 (that is the falling, or drawing out, of a wave from the oscillating water chamber) which provides the maximum power generation feature, and the energy produced by the rotation of the turbine 44 in this configuration is significantly more than is achievable using either (i) bidirectional turbines, or (ii) using the pressure of an upstroke of air pressure into the duct and upward through a turbine, such as from an incoming ocean wave (the latter is the weakest in terms of energy).

The first conduit 12 of the duct 10 is arranged in use to be substantially submerged below the mean surface level (MSL) of a body of water, and oriented with its elongate axis oriented generally horizontally to be aligned with the sand and rock base. In the uppermost region 36 of the second conduit 14 are a number of flow control devices in the form of one-way deformable flaps 38, which operate passively so they are at rest in the closed position, and can be moved into an open position by fluid flow. The uppermost region 36 inside the second conduit 14 (and above the maximum level of water 32) defines a flow passage 40, which is also in fluid communication with a unidirectional turbine 44.

Geometrical design features adopted by the inventor include the introduction of the use of a sloping exterior surface of the base 18 of the OWC. The base 18 slopes in a downward direction when moving toward the mouth end (open end) 20 of the first conduit 12 (see FIG. 3 and FIG. 10). The OWC duct 10 will be seated more readily and stably in its preferred location, if its base 18 matches the slope of the seabed, for example on a downwardly sloping seabed moving away from the shoreline. The aim of this feature is to minimize the amount of seabed preparation required for the positioning of the duct 10, and to optimize the axial alignment of the duct to face outward onto the incoming waves.

Importantly, because the access to the displaceable gas in the flow passage 40 in the uppermost region 36 of the second conduit 14 can be via one or more valves 38 (or other forms of flow control devices) as well as via the unidirectional turbine 44, it is possible for the system to be configured to operate each form of access to the flow chamber separately, and sequentially, to the other. By doing so, this means that the design of the turbine 44 can be considerably simpler than the arrangements in prior art oscillating water columns for power generation, many of which have focussed on the development of new turbine designs which can cope with a bidirectional air flow using a turbine which rotates unidirectionally on a shaft. In such prior art equipment, the gas in the flow passage in the uppermost region of the second conduit is displaced by the vertically rising water in the duct, and flows out of a unidirectional turbine and becomes discharged to the atmosphere, but when gas is drawn back into the flow passage by suction, it needs to flow via the same unidirectional turbine but in the opposite direction, which necessitates an adjustable flow turbine design of great complexity.

In the present system, the turbine 44 is of a basic known design, and includes a turbine rotor 48 comprising a central hub 50 located on one end of a rotatable shaft, and a plurality of blades 52 arranged about and extending from the periphery of the hub 50, the rotor 48 being disposed within a turbine housing 54 in fluid connection with the flow passage 40. The shape of the turbine blades 52 and their orientation in relation to the hub 50 facilitates unidirectional rotation of the turbine rotor 48 in response to a unidirectional axial flow of gas through the turbine housing 54.

In yet further embodiments, the shape of the turbine blades 52 and the interior of the turbine housing 54 can be of a different configuration which is arranged to improve the efficiency and maximize the energy conversion of the turbine blades by minimising turbulence or drag forces at the tip of the turbine blades so as to maximise the effect of airflow rate on blade surfaces.

As is typical in turbines of this type, an electric generator is configured for rotation by the turbine to generate electrical energy, and is connected to the drive shaft of the turbine 44, via an inverter and this has been explained in detail later in this specification.

Figure 6B:
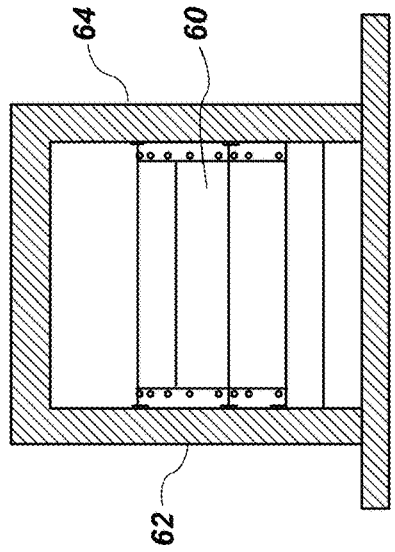
FIG. 6B is a view in cross section of the apparatus shown in FIG. 6B taken as line A-A thereof.
Figure 6A:
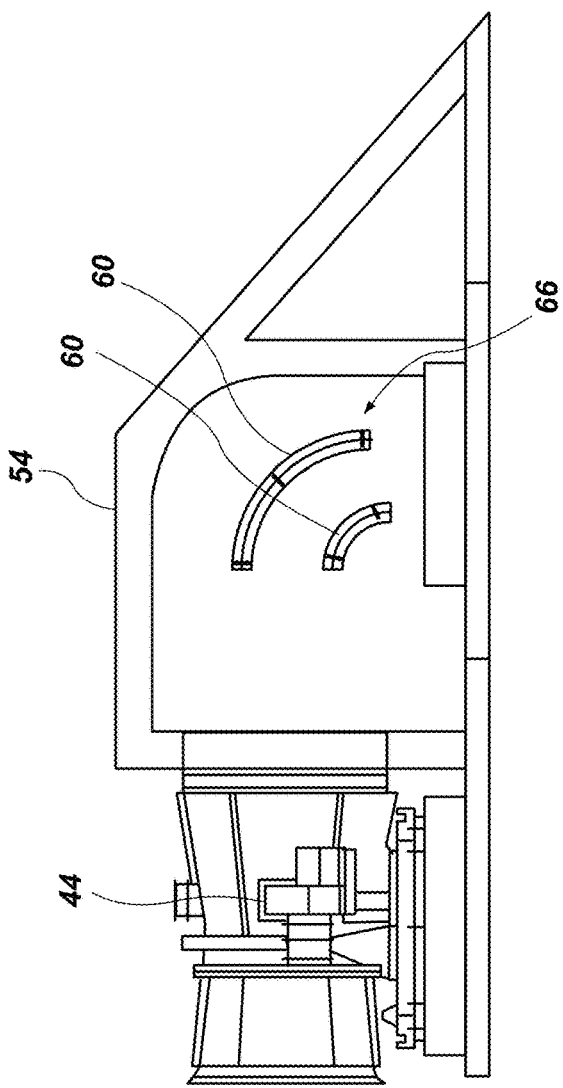
FIG. 6A is a side view in cross section illustrating an embodiment of the apparatus of the disclosure having two curved baffles.
Figure 6C:
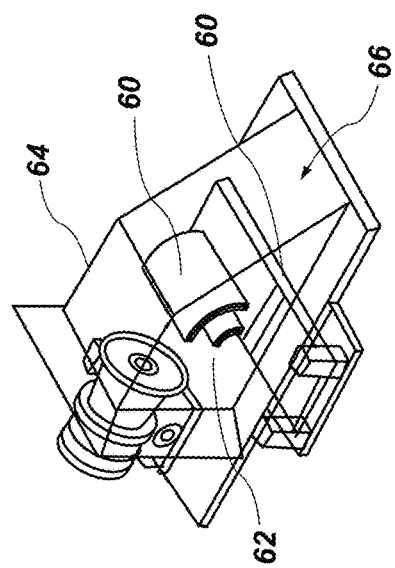
FIG. 6C is a perspective view of the apparatus shown in FIG. 6A.
Figure 7C:
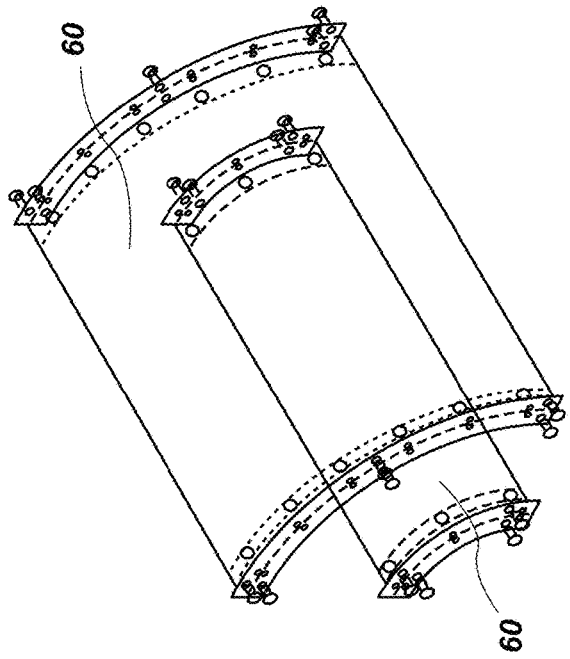
FIG. 7C is a top perspective view of the two baffles shown in FIG. 7A.
Figure 7D:
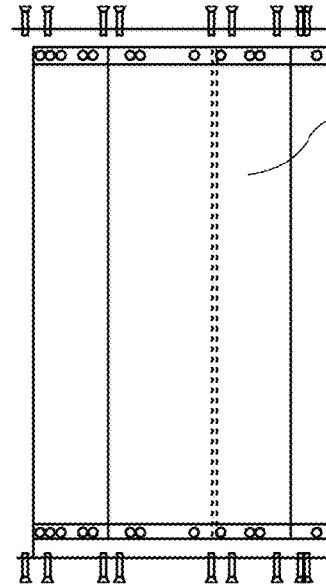
FIG. 7D is an end view of the two baffles when viewing in the direction of the turbine.
Figure 7B:
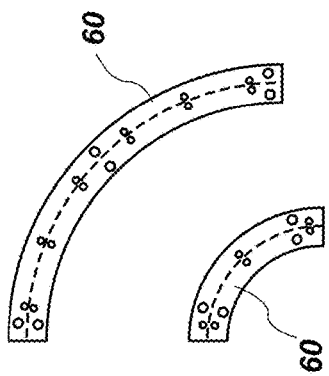
FIG. 7B is a side view in elevation of the baffles shown in FIG. 7A.
Figure 7A:
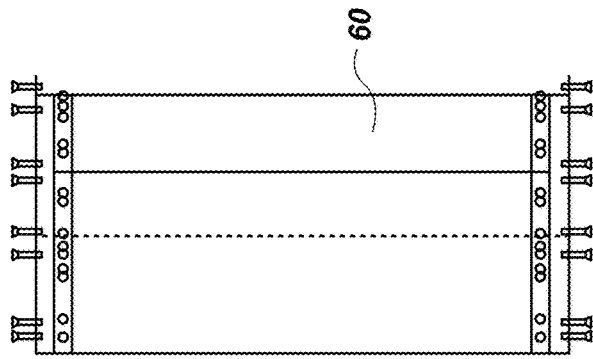
FIG. 7A is a top view in close up of the two baffles shown in FIGS. 6A-6C.

In addition to that, as shown in FIGS. 6A-6C, guide vanes have been introduced to the interior centre of the passage which is located between the turbine housing 54 and the flow passage 40. Two guide vanes 60 are shown in the form of curved planar fins which bridge the interior side walls 62, 64 of the curved end region 66 of the turbine housing 54 which is adjacent to the upper end of the flow passage 40. The guide vanes 60 are arranged to be positioned mid-stream in the axial direction of flow of the working fluid (air).

These guide vanes 60 function to reduce the turbulence of air flowing into the flow passage 40 during the downstroke interval (as the wave moves out of the OWC duct). During the downstroke interval, there is a rapid increase in the flowrate of air which is drawn into the flow passage 40 via the turbine 44, under that suction pressure. The aim of the guide vanes 60 is to streamline the flow of air as it turns and flows through a 90 angle degree change of direction, and as a result maximize the thrust energy being transferred onto the turbine 44 as the air is drawn past it, as well as to reduce frictional losses arising from turbulence.

Figure 4C:
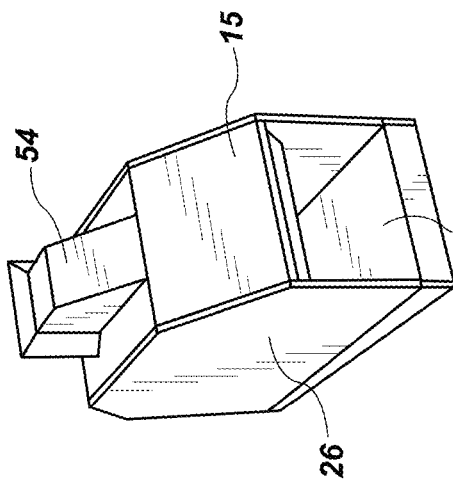
FIG. 4C is a forward end view of the apparatus shown in FIG. 4B when rotated ninety degrees to the right.
Figure 4D:
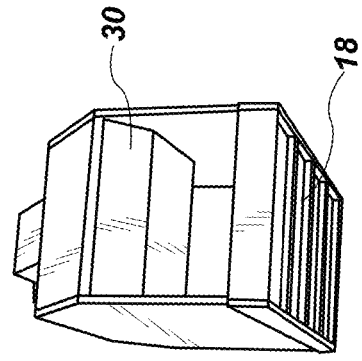
FIG. 4D is a perspective view of the apparatus shown in FIG. 4C, illustrating a base surface.
Figure 4E:
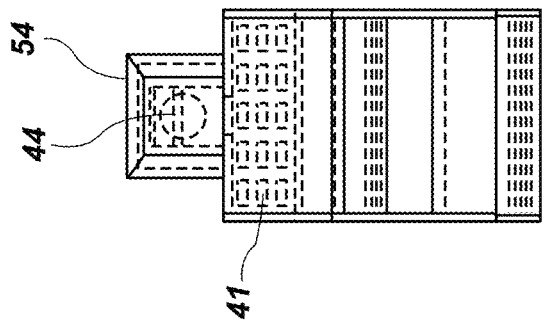
FIG. 4E is a perspective view of the apparatus shown in FIGS. 4C and 4D, illustrating a top view of the apparatus.
Figure 4A:
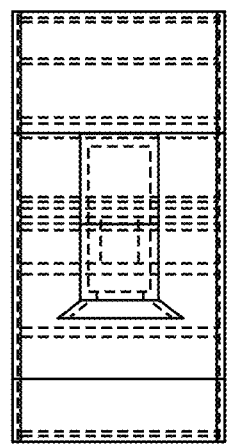
FIG. 4A is a plan view of the apparatus shown in FIGS. 1 and 2.
Figure 4B:
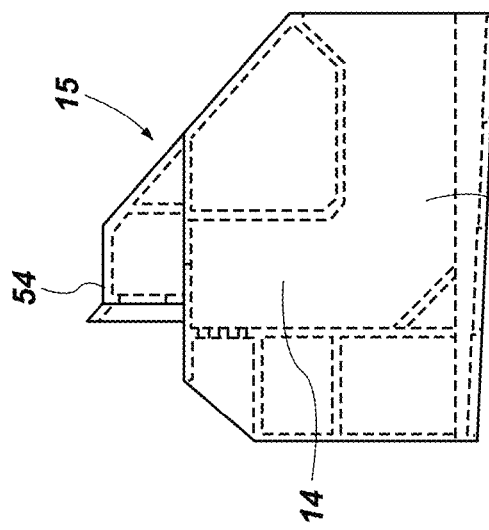
FIG. 4B is a side view in elevation of the apparatus shown in FIG. 4B.
Figure 10:
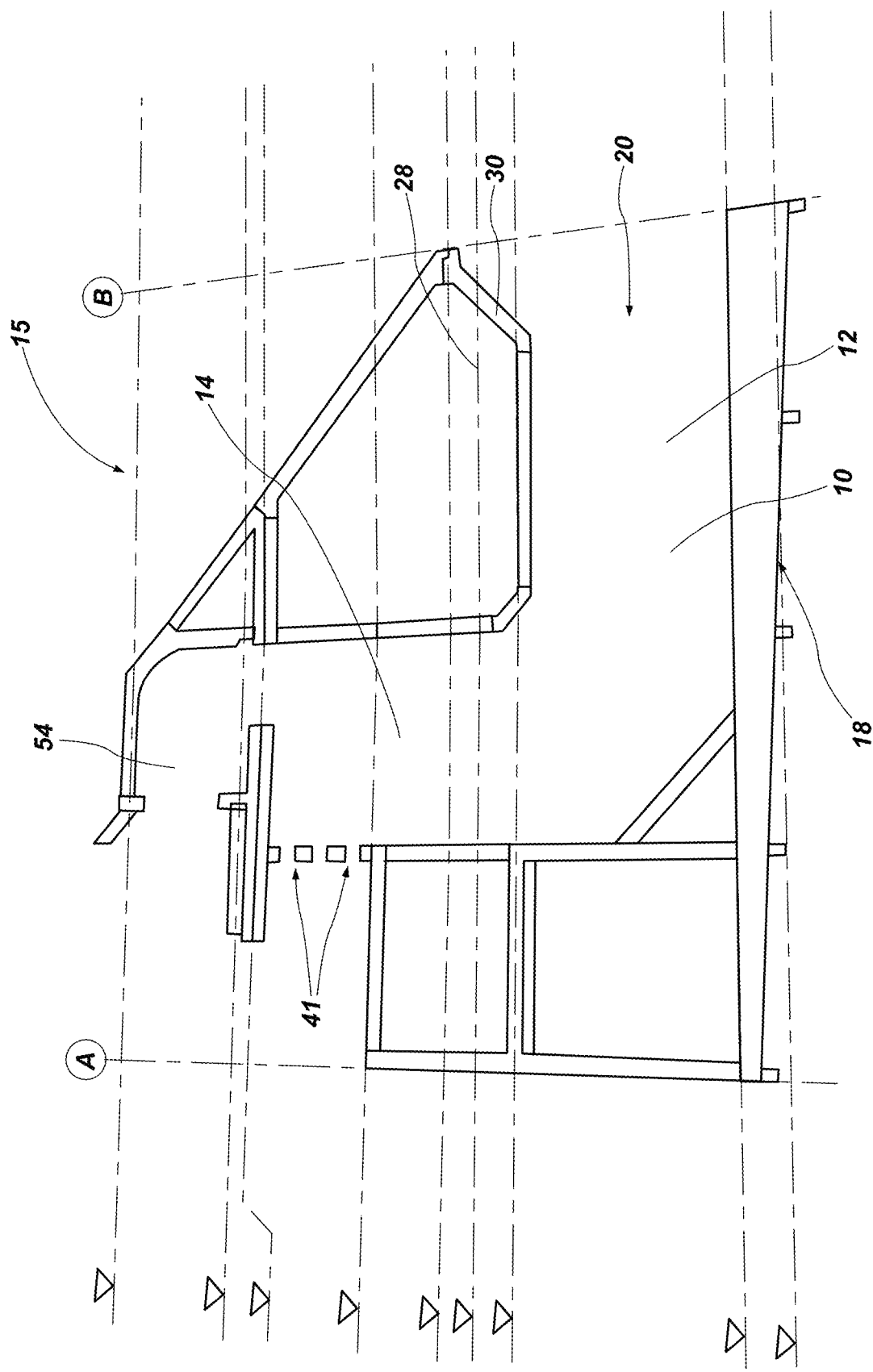
FIG. 10 is a side view of the apparatus of FIGS. 1 and 2 illustrating the sloping base.

As is shown in FIGS. 4C and 10, the uppermost region 36 of the second conduit 14 of the duct has fifteen rectangular openings 41 arranged in a grid, onto each of which is fitted a deformable flaps 38 are fitted in use as a closure. In other embodiments, more or less than this number of deformable flaps 38 can be installed at the time of the initial construction of the duct 10, depending on the location and expected ocean wave severity that will be encountered, being a design feature which can change the possible maximum venting ratio of the particular duct. In other embodiments, the type of one-way valve, closure or flap can also be varied, and also combinations of different types of one-way valves, closures or flaps are possible to be fitted onto each opening.

Once the repeated steps of opening the deformable flaps 38 as the wave enters the duct 10, followed by their closing and air being drawn into the second conduit 14 via the turbine 44 as the wave leaves the duct 10, have reached a stable pattern, the turbine 44 and generator will generate electrical energy which can be conveyed from the duct 10 (if located offshore) to the land (on the shore) by means of an insulated high voltage copper cable.

As a general and non-limiting indication of size, a typical housing 15 of the design shown in the Figures has a first conduit length of around 8-10 metres, and a second conduit which extends 15-18 metres above the base surface of the body or water or ocean shoreline at which it is located. In one example, the structure of the duct is typically made of reinforced concrete, so as to have the weight and strength to be able to withstand the pressure of repeatedly being struck by ocean waves, in a corrosive salty environment.

The inventor has discovered from experimental results using the new energy extraction apparatus that there is a significant increase in the energy capture from a unidirectional turbine 44 which is configured to operate with a unidirectional flow of air, rather than a unidirectional turbine which is configured to operate with a bidirectional flow of air. For an equivalent period of operation, as air is drawn through the turbine 44 and into the flow passage 40 when the wave moves out of the duct 10 towards the body of water 16, the energy generated is 16% better than could be achieved using known bidirectional turbine designs with a flow operating in that same direction. It is believed that this improved result is caused by a combination of the downward hydrostatic pressure head of the oscillating water column located in the second conduit 14, in addition to the suction draw of the body of water 16, as it draws water out of the duct 10. Therefore, because the present system can be configured to isolate the steps of both expulsion out, and suction in, of air in relation to the flow passage 40 using different devices, it is possible to capture energy solely from the gas flow which operates in response to the wave outflow from the duct, which is also the flow with the highest potential energy.

The inventor has also discovered from experimental results using the new energy extraction apparatus that there is a significant increase in the energy capture when various features are added near to or around the opening mouth 20 of the first conduit 12. The accelerated delivery of flow of the incoming waves into the duct 10 results in a further improvement in the energy able to be generated when compared with known oscillating duct apparatus without such features. It is believed that by directing more fluid into the duct 10 on the upstroke, subsequently results in more air being drawn down via the gas turbine 44 into the flow passage 40 in the second conduit 14 as the wave leaves the OWC duct 10 on the downstroke.

To safely position a heavy and robust apparatus such as the illustrated housing 15 containing an oscillating fluid duct 10 partially in the water at the edge of a body of moving water, is fraught with difficulties. The inventor has therefore devised a way to position the apparatus using reusable, submersible buoyancy tanks. Reference should be made to FIGS. 5A to 5G.

In a non-submerged state, the housing 15 is able to be moved by towing behind a shipping vessel for in-water location thereof. The housing 15 is itself fitted with flotation aids in the form of twin elongate tanks 70 which are filled with air and sealed, to provide sufficient buoyancy to transport the assembled apparatus to its final location. As will be explained, as well as acting as flotation aids to provide buoyancy, the elongate tanks 70 can also be used to provide a controlled submersion (or partial submersion) of the housing 15 at the final location.

The tanks 70 are secured onto both of the opposing, elongate exterior side walls 26 of the housing 15 by a coupling, which can be made permanent, or releasable if necessary to allow the tanks 70 to be removed for re-use. Once the housing 15 containing the interior duct 10, has been fitted with a turbine 44 positioned in a turbine housing 54, then the apparatus is ready for installation on the seabed. The two empty elongate tanks 70 are then attached in position along either elongate side of the housing 15. These steps are best done at a submersible dock (or equivalent dry platform adjacent to the water during the construction phase) and then lowered into the water for towing to the final location.

The two empty tanks 70 remain sealed and contain only air, so that they provide buoyancy for the movement of the housing 15 by floating on the water. The assembly of two buoyant tanks 70 and the housing 15 can be towed behind a shipping vessel, for example a tugboat, using long cables, in order to be moved toward the pre-determined final destination of the apparatus in the body of water, such as a seabed near a shoreline.

Figure 5D:
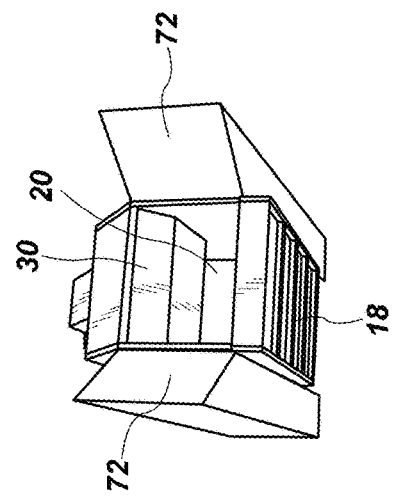
FIG. 5D is a perspective view of the apparatus shown in FIG. 5C, illustrating a base surface.
Figure 5E:
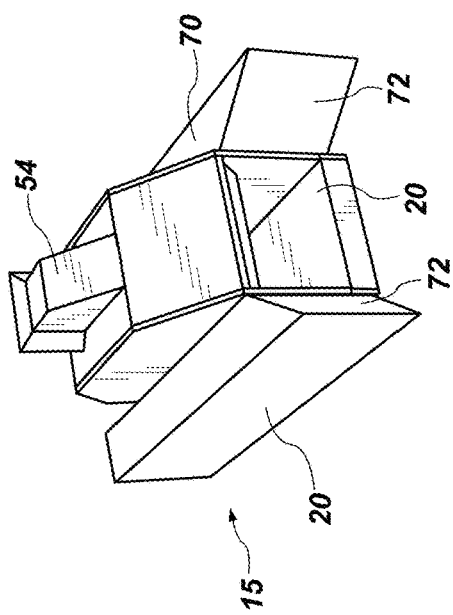
FIG. 5E is a perspective view of the apparatus shown in FIG. 5C, illustrating a top surface.
Figure 5C:
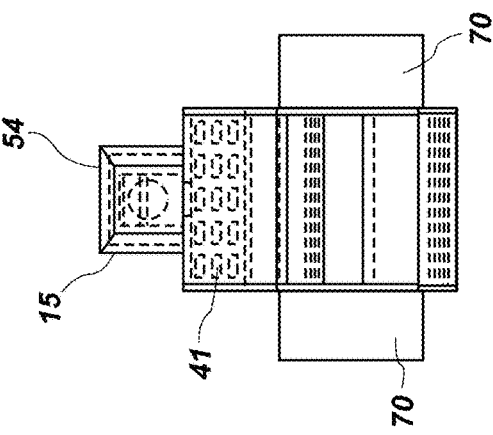
FIG. 5C is a forward end view of the apparatus shown in FIG. 5B when rotated ninety degrees to the right.
Figure 5A:
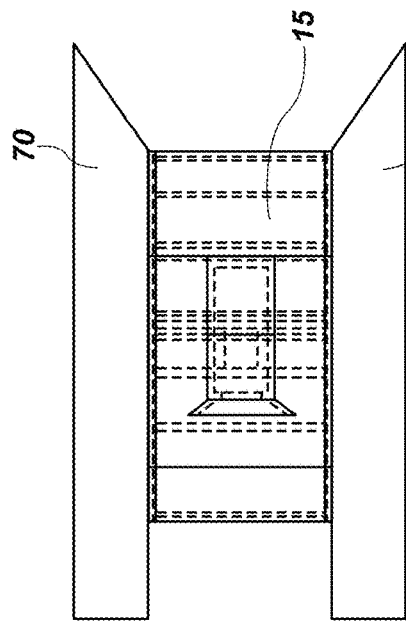
FIG. 5A is another embodiment of the apparatus of the present disclosure illustrating the housing fitted with flotation aids, FIG. 5A being a top plan view of the apparatus.
Figure 5B:
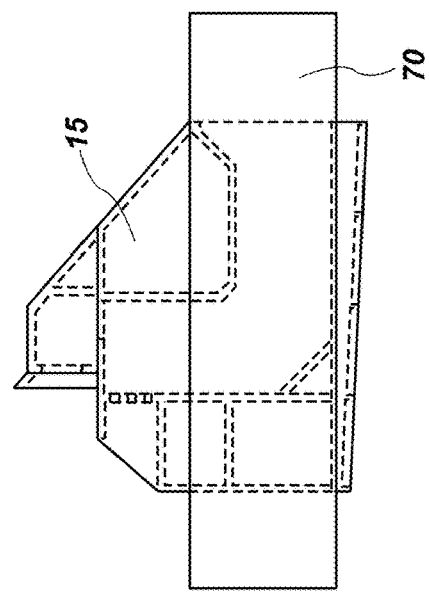
FIG. 5B is a side view in elevation of the apparatus shown in FIG. 5A.
Figure 5G:
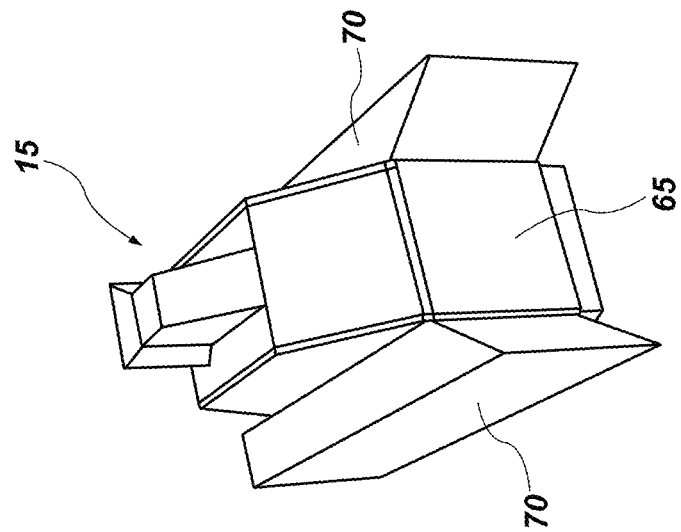
FIG. 5G is a perspective view of the apparatus shown in FIG. 5B, when rotated ninety degrees to the left, and illustrating a top surface.
Figure 5F:
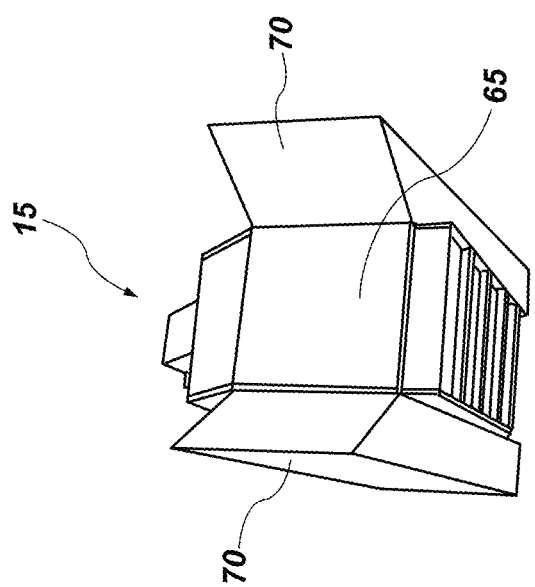
FIG. 5F is a perspective view of the apparatus shown in FIG. 5B, when rotated ninety degrees to the left, and illustrating a base surface.

The duct 10 which is arranged in the interior of the housing 15 has a rectangular-shaped end opening or mouth 20 which is arranged in use for receiving an incoming wave flowing in from the body of water, where in use the mouth 20 is oriented outwardly to face into the body of water which is the source of the waves. As shown in FIG. 5F, the mouth 20 is also fitted with a removable end door 65 which is positioned during the transportation step across the water, and arranged to block the ingress of seawater or lake water into the interior duct 10 of the housing 15 during towing of the OWC housing 15 to its final resting position. This end door 65 traps the air which is present in the interior of the duct 10 so as to make the housing 15 itself buoyant during the transportation step also assist the movement of the apparatus by making.

In the assembled configuration, the end faces 72 of both of the tanks 70, which are located adjacent to the vertical sides of the mouth 20, are angled so that when the tanks are partially submerged adjacent to the partially submerged housing 15, in use, those end faces will function as seawater entry guide vanes located at both vertical sides of what will be the open mouth of the OWC chamber, when it is oriented to face the incoming waves from the sea, once the door 65 is removed. The use of an optimum angle of repose of between 40-50 angle degrees with respect to a central elongate axis of the entry mouth (when viewed in plan) has been shown experimentally to maximize the quantity of water that can be channelled into the flow passage 40 at the interior of the duct 10. Maximizing the ingress of water from a passing wave into the interior chamber of the OWC should result in a greater compressive displacement of water thereinto, and greater expulsion of air from the flow passage 40 on the upstroke cycle. The inventor has also shown that the consequence of this will be to maximize the negative (suction) pressure of air across the gas turbine 44 on the downstroke cycle, and likewise maximize the airflow rate which is drawn into the flow passage 40 via that gas turbine 44. A greater airflow rate will produce more rotational energy from the gas turbine 44, thus increasing the quantity of energy generated and captured.

Figure 8:
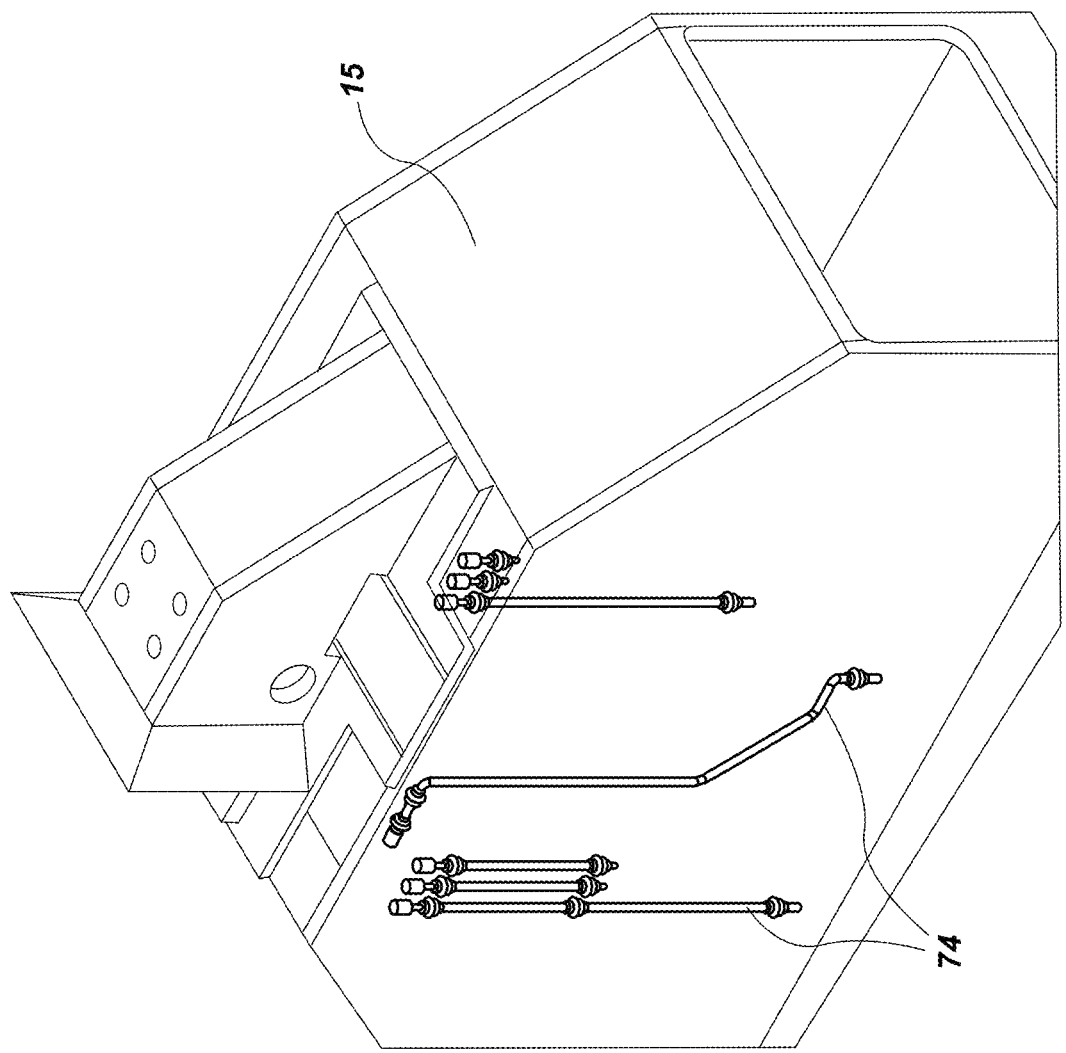
FIG. 8 is a perspective view of the apparatus shown in FIG. 4E illustrating the position and orientation of flexible fluid ducts.
Figure 9:
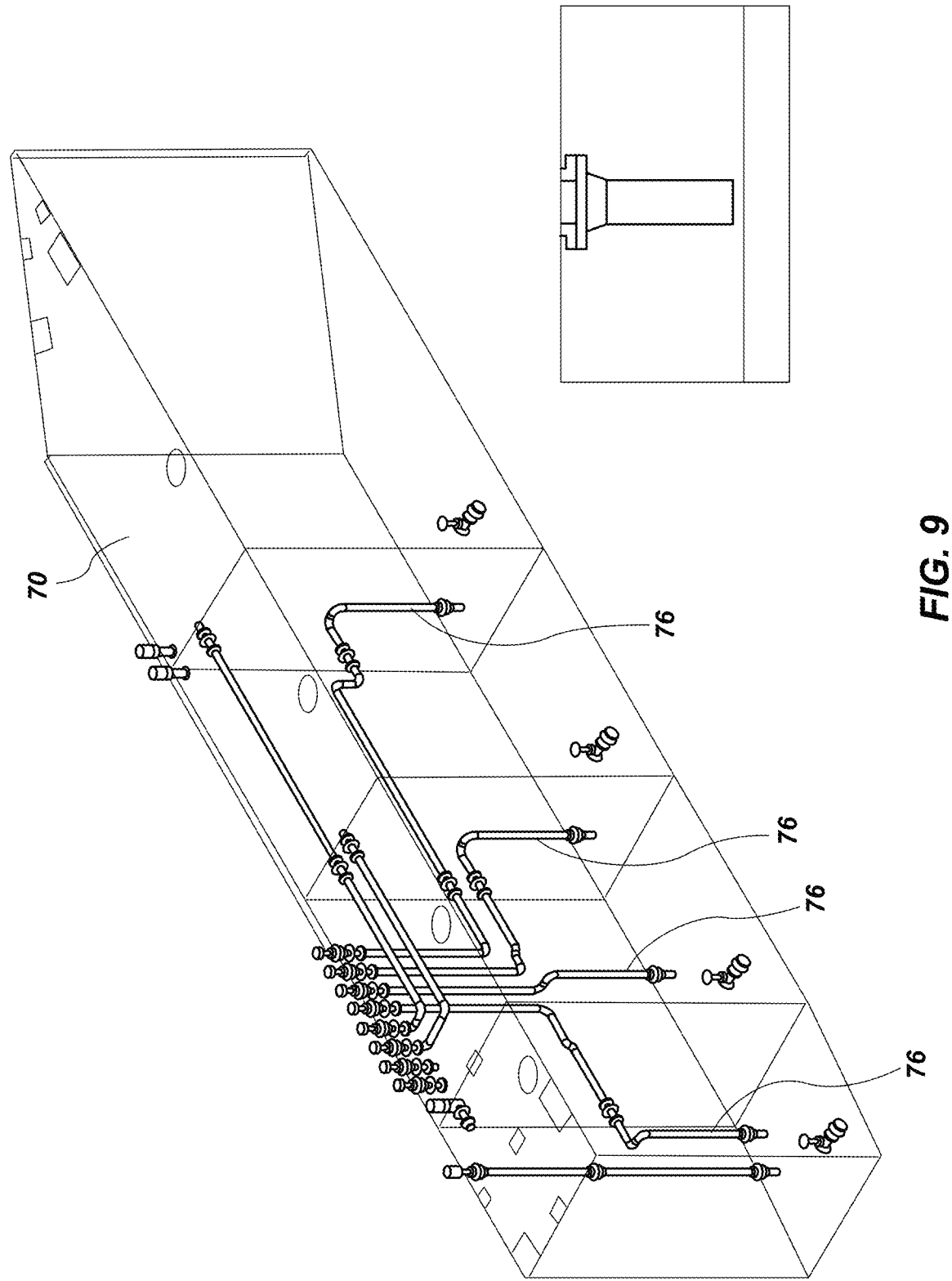
FIG. 9 is a view of the apparatus shown in FIG. 5E demonstrating the structure of a buoyancy tank.

When near the final location, the duct 10 can be partially submerged by removing the end door 65 and allowing seawater to flow into the interior of the flow passage 40, as well as by flooding the two side tanks 70 by pumping water via various flexible conduits 74 located on the OWC housing 15 (as shown in FIG. 8) when they are connected to various fixed conduits 76 (as shown in FIG. 9) which are located within each tank interior. Once these air-filled or floating components have been flooded, the duct 10 will be seated at its final desired final operational position. The flotation tanks can be removed and re-used or can remain in position with the end walls functioning as seawater entry vanes, and the remainder of the tank bodies providing protection for the duct 10 from wave impact, or ocean debris, etc. Under gravity the duct 10 is settled into its position on the shoreline sea floor, and remains partially submerged in its final position in the water, where it will capture waves and generate energy.

Using the submersible tanks 70 provides great advantages such as stability of handling such a sizeable apparatus when moving across open waters to reach a remote coastline for final installation. The submersible tanks 70 minimise the risk of capsizing or sinking of the duct and turbine apparatus in rough weather.

Alternative Structural Features for Apparatus

The OWC shown in the drawings is a large hollow concrete chamber, partially submerged and sitting on the seabed and vented to the ocean through an underwater opening. The chamber also includes a small opening to the atmosphere above the water line, in which is housed an air turbine.

As wave crests and troughs pass a conventional OWC, water enters and leaves the chamber through its submerged opening. This water rises and falls inside the chamber, causing the pressure of the air trapped above to oscillate between positive and negative pressure. In some past embodiments, these pressure fluctuations forced the air to pass through a bidirectional turbine at the top of the chamber, in an attempt to stably generate electricity as it does so.

The fundamental conceptual difference between the OWC of the present disclosure and with conventional OWCs is that the turbine is only exposed to air flow from one direction. Passive air flow valves allow air to escape the chamber but not return. This results in simpler turbine design constraint which means the turbine can be optimised for unidirectional air flow. Also, the turbine exhibits low frictional losses.

Even though air is directed through the air turbine for only half the wave cycle, almost all the energy from the entire wave cycle (subtracting conventional turbulent and frictional losses) is available for extraction.

In further embodiments, the inventor has incorporated design changes to the OWC which are aimed at increasing the expected service life of the apparatus, and/or seeking reductions in capital costs as well as in operating costs (for example, ways of reducing on-going maintenance expenses).

For example, the version of the OWC which is shown in the drawings is designed to be seated on the seabed, in relatively shallow coastal waters of about 5-10 metres in depth (water depth as measured from the seabed). However, the inventor is aware that a reduction in the maximum wave height which reaches an OWC structure means a significant reduction in the force of the moving water which impacts upon it, since the force experienced by the OWC is proportional to the square of breaking wave height.

Therefore, a redesigned OWC unit for use in shallower coastal water operation (for example, which operates in waters of about 2-4 metres in depth, typically 3 metres (water depth as measured from the seabed) required the use of computational fluid dynamic (CFD) modelling to optimize the shape of the water entry mouth, and the shape of the interior of the OWC chamber, with the operational aim of maximising the accelerated delivery of flow of the incoming waves into the duct on the upstroke, which subsequently results in more air being drawn into the flow passage via the turbine as the wave leaves the duct on the downstroke, thus optimising the efficient conversion of the energy in waves in such low depths.

A sea environment in which a significantly reduced force of water will impact an OWC structure using structural engineering optimization has indicated that a reduction in the capital cost of OWC structures needed in such an environment can be achieved with the use of any of the following:

- less (or thinner) materials of construction;
- lighter (or less dense) materials of construction;
- a reduction in the amount or type or arrangement of structural reinforcement which would otherwise be needed in deeper water, more heavy-duty applications; and
- a reduction in the overall size of the unit compared to the unit size needed in deeper water, heavy-duty applications.

Location Factors for Consideration when Using OWC

By designing an OWC to operate in shallow coastal water depths from the seabed (such as 2-4 metres) means that the OWC structure is located in a sea environment in which a significantly reduced force of water will impact upon it, leading to a reduction in the capital cost of that structure, as well as optimising the efficient conversion of the energy in the waves found in such low waters.

The development and use of a more compact version of an OWC structure thus increases the range of locations in which the apparatus can be deployed. Having the option of either a shallow water OWC, or a relatively deep water OWC, provides users in different physical locations with multiple site-specific solutions. For example:

- some remote locations may only require a shallow water OWC because of its smaller size and power output, and have no need for a larger, heavy-duty deep water OWC; or
- in some locations, the rate of change of water depth measured out from the shoreline may determine whether installation of a shallow-water OWC can occur, or if only a deep water OWC is feasible; or
- in some locations, a combination of both a shallow-water OWC and a deep water OWC may be useful, depending on the prevailing wave patterns arising from local land and undersea geography, as well as the rate of change of water depth measured out from the shoreline.

A further option to increase the range of locations in which an OWC apparatus can be deployed, regardless of whether the OWC apparatus is of the design and type aimed for shallow water or relatively deep water operation, involves apparatus which can be flexibly deployed and operated over a range of depths of relatively shallow coastal waters (water depth as measured from the seabed).

The embodiments disclosed in the drawings of the present application involve securing an OWC unit to the seabed under its own weight, necessitating a very heavy structural design, which adds significant cost, both in materials and in transportation costs. It also requires a choice of location with a relatively flat seabed.

For example, the OWC structure can be secured to the seabed, by using, for example, adjustable height supporting legs, which are able to be fitted to the base of the OWC, and which are also able to be anchored by penetration of the seabed. If the height of the individual legs is adjustable to achieve the required depth and slope of the unit, this allows for the installation of units in seabed locations which can be of uneven depth and varying geophysical conditions, in an easier manner.

The development of new techniques for securing the OWC structure to the seabed also gives users the flexibility to deploy lighter weight OWC units, and to do so in areas that have variable seabed profiles, thereby broadening the geographical reach of the technology, and reducing the cost of materials and transport.

In yet further improvements aimed to increase the range of locations in which an OWC apparatus can be deployed, the inventor has devised ways to concentrate the natural directional movement of wave swell in the sea, towards and into an OWC duct by developing and locating external, auxiliary structures which are located in the sea or on the seabed, and arranged in proximity to the OWC duct. The purpose of these structures is to focus, refract and/or redirect by deflection, the energy from ocean waves, and thereby to concentrate this energy toward and into the mouth of the OWC duct.

There are no changes to the OWC itself, but the external structural shaped objects which can work in conjunction with an OWC unit are typically designed to be located in a fixed position adjacent to the OWC unit once it has been itself placed in its final resting position, the design of the external objects arranged to is to focus, refract and/or redirect by deflection, the moving waves toward it. The external objects need not be located to be visible above the water level of the surrounding sea, but can for example comprise an undersea mound, aimed to alter the local velocity of water nearby it, and the direction of that water flow.

Preliminary investigations suggest that, for a very modest increase in capital cost, the increase in energy available for capture by an OWC duct can be increased by about 50% or more.

Energy Capture and Storage for OWC

The efficiency of conversion of the energy of moving working fluid into rotational gas turbine depends on the turbine design, and various flow efficiency parameters, which have already been mentioned. However, whenever the gas turbine is rotating, some electrical power is able to be generated.

In the present disclosure, the inventor has also devised ways to improve the efficiency of electrical energy capture and storage in conjunction with an OWC power plant. In the present case, the OWC operates using repetitive cycle, bidirectional flows, but the electrical power output which is generated is from using a unidirectional turbine, so it is delivered in periodic, repeated, sinusoidal bursts, with gaps in between of an equivalent period.

While this is not a major issue when delivering energy into large mainland power grids, it can be an issue for microgrids (usually powered by clean and renewable energy), and for small and/or remote grids, such as those on islands and developing nations, where such an output is not a stable electrical power resource. Power quality problems have more impact on users who are linked to small, local or isolated power grids, and fluctuations in the electricity supply can cause equipment failures. Sensitive industrial loads and critical commercial operations can suffer greatly from outages and service interruptions, resulting in financial losses to both utility and consumers. In densely populated countries, depending on events which involve a mass of the population, there can be sudden swings in the grid load demand, and the gap between supply and demand have made the reliability and power quality a critical issue. Where power grids now have a greater reliance on some forms of alternative energy, and less base load sources, a grid can even become unstable.

The energy capture and conversion system (both hardware and software which controls it) is used to control the electrical energy output from the OWC unit. This is fundamental to the integration of the OWC with a customer power grid via a control system. Typically, the OWC turbine 44 will be connected to a drive, an electrical power generator and various types of transformer apparatus. In the OWC of the present disclosure, the volume of working fluid (air) able to be drawn through the gas turbine will determine its rotational speed. The power output of a gas turbine is related to its rotational speed. A graph of the power output of the gas turbine over time during the downstroke interval (when a wave moves out of the interior of the OWC, in the second configuration) initially has a sinusoidal shaped form, reflecting an increase followed by a decrease in rotational speed of the turbine. The gas turbine is rotating in what is called the operating (or "running") mode. Subsequently, a graph of the power output of the turbine over time during the consecutive upstroke interval (when a wave passes into the interior of the OWC, in the first configuration) is flatline in its form, and reflects the constant, low, inertial rotational speed of the turbine, yielding a relatively low rate of power generation. The turbine is rotating in what is called the standby (or "coasting") mode of operation.

In a repetitive cycle, this type of power generation is known as "burst mode" power delivery. Power is the rate at which an amount of energy is delivered, and in the case of wave energy capture via a unidirectional turbine, the power output comes in periodic, repeated bursts, with gaps in between of an equivalent period. Such variation in power output would not be suitable for the operation of most common electrical devices, and lighting etc., so an energy storage device can be implemented to buffer the gaps between the bursts in power output.

Improving the quality of power produced can be done with the help of energy storage devices such as supercapacitors or other reactive power injection systems. Supercapacitors can be used to buffer those gaps in power output. These devices can be charged during those intervals when the turbine is operating at higher rotational speeds, when air is being drawn therethrough on the downstroke and excess power is being generated so that, during the upstroke interval which follows, when the turbine is only operating at its inertial speed of rotation and generating a low amount of power, these devices can then be discharged to deliver a burst of energy, to thereby elevate the output power level of the system, thus making the output power level more consistent over consecutive intervals (or first/second operating configurations).

Supercapacitors have the ability to store a large amount of energy, and to be recharged quite rapidly. Supercapacitors are useful through thousands of charge and discharge cycles. There are many types of supercapacitor devices becoming available with different materials to enhance the storage of energy, such as graphene, and cobalt-manganese oxide, and there are also possibilities to combine the storage capacity of batteries with that of supercapacitors.

Now with reference to the embodiment shown in FIG. 1 and FIG. 2, in use, there is an OWC which moves in and out of the duct 10 which is located in the housing 15, and the oscillating working fluid which moves in and out of the flow passage 40, as the profile of the local waves rises, the OWC level rises within the duct 10 of the housing 15 to create a positive air pressure in the flow passage 40, which is located above the OWC. In the first operational configuration of the apparatus, this pressure is relieved via one-way flap valves 38 which are located int an upper, rear exterior wall of the housing 15. This manner of exhausting the positive pressure from the flow passage 40 has the consequence that it allows the gas turbine 44 to be of a design which can be operated unidirectionally. In the first operational configuration, the air turbine is rotating in the standby (or "coasting") mode.

As the falling profile of the local waves leaves the shore, it draws the oscillating water column outward from the duct 10 within the housing 15, and an air pressure drop is created in the flow passage 40. To equalise the pressure with the atmospheric pressure, the apparatus operates in the second configuration during which a differential pressure is present across the air-driven gas turbine 44. The gas turbine 44 is located in a turbine housing 54 which is connected to the flow passage 40. The differential pressure draws air through the gas turbine 44, resulting in its rotation, and air passes into the flow passage 40. The air turbine 44 is in the operating (or running) mode during the period when the OWC is drawn outward from the duct 10 within the housing 15, and retreats from the flow passage 40.

Figure 13:
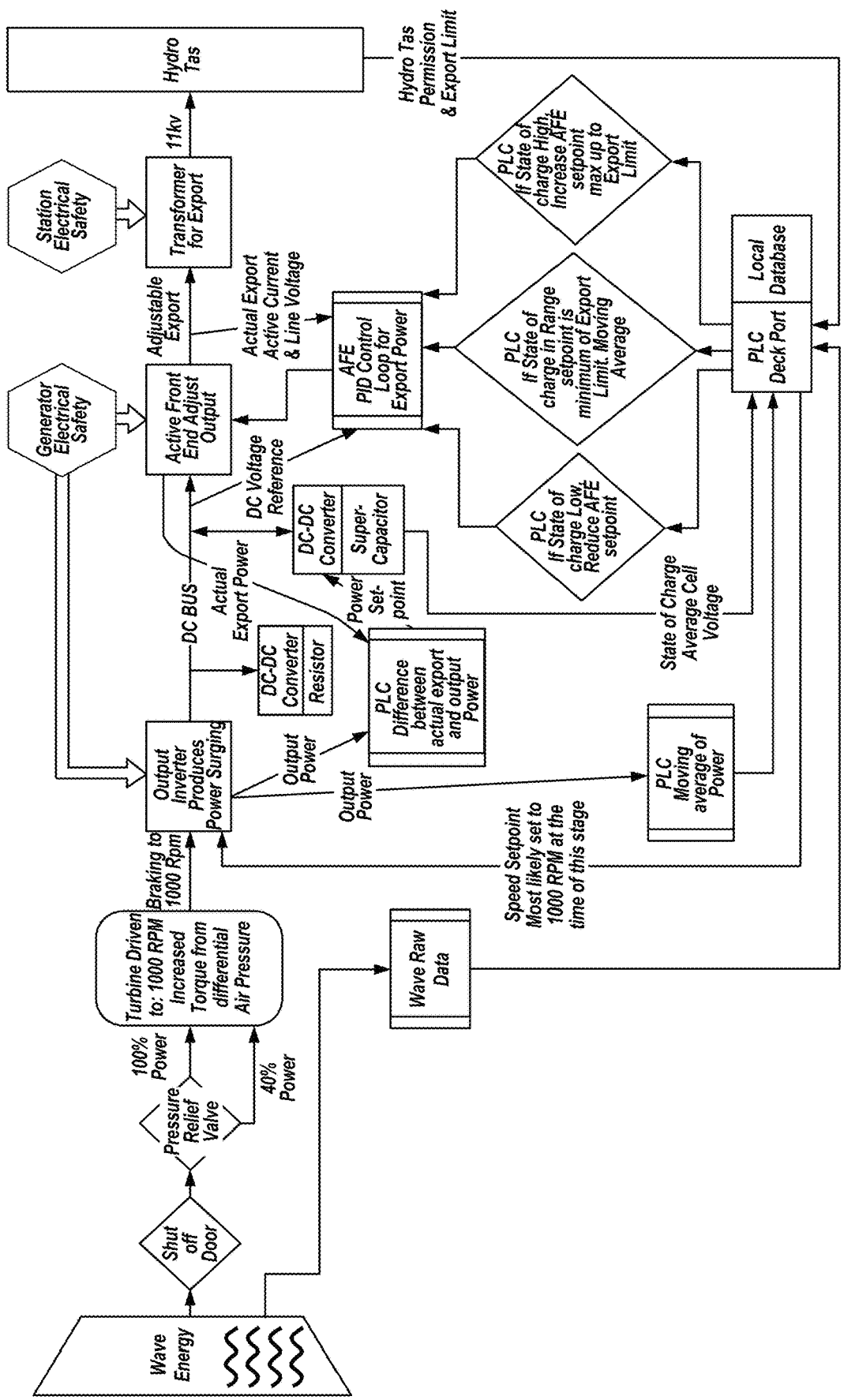
FIG. 13 is a schematic flow diagram showing the details of a power generation and power offtake system employing the apparatus of FIG. 1.

Reference is now made to FIG. 13 which shows some of the power generation and power offtake details of the apparatus. The pneumatic power arising from air pressure acting on the gas turbine is capture by creating mechanical power in the form of air turbine torque. The air-driven turbine 44 is directly coupled to a 3-phase electric motor that is controlled by an Active Front End (AFE) drive. An energy output inverter is connected to the rotating turbine 44 and drives the electric motor to an appropriate rotational speed. A typical operational rotational speed of 1000 rpm is set through the power generation period at this stage.

The AFE drive operates in a regenerative braking mode. The speed setpoint of the motor by the drive is set below the value which would normally occur from the torque which drives such an air turbine in response to the air pressure differential when the OWC system is operating in the second configuration. In this way the system actively opposes the mechanical power in form of the air turbine torque, which is created from the pneumatic power resulting from air pressure changes. The regenerative braking against the torque converts the mechanical energy of the gas turbine 44 into electrical energy (power). A rechargeable energy storage device such as a DC Bus is thus charged during rotation of the turbine 44 in the second configuration. Depending on the optimal operating band (based on sea and generation conditions) in one pilot plant example, the motor can be driven at a speed setpoint below the turbine speed of between 5 RPM to 850 RPM. The AFE drive will apply a constant braking force at a defined setting, and this braking force will cause a rise in the DC Bus voltage.

Some suitable rechargeable energy storage devices (such as supercapacitors) can be charged during the intervals when the turbine 44 is operating at a higher rotational speed, and then can be discharged to elevate the output power level of the system when the turbine 44 is operating at lower rotational speed when operating in the first configuration. As stated previously, a supercapacitor is an enclosed capacitor unit that can rapidly store and discharge electrical power. A DC-DC converter is used to reduce the DC Bus voltage to the appropriate DC voltage for the supercapacitor. This module ensures that the supercapacitor is charged and ready for generation.

The supercapacitor Charge/Discharge flow setpoint is established during operation. A minimum starting charge must be achieved, then the supercapacitor operates between 20-80% of its State of Charge to prevent rising voltage on DC bus, and a shortening of the supercapacitor lifespan.

The electrical discharge from this chargeable device is used to maintain the export power at a desired constant value during the fluctuation of wave power coming into system. In one example, the discharge electrical power of the supercapacitor is approximately 0.76 kWh which would provide export power at the average of 30 KW for 90 seconds. The use of a chargeable device such as a supercapacitor smooths out the surging generation which is otherwise inherent in the burst mode type of power generation system.

The Active Front End (AFE) Module is designed to connect from the DC Bus of the drive module to the local AC power grid. The role of the AFE is to ensure power supply to the equipment connected to the DC Bus and maintain their powered state, and to convert the DC Bus voltage to the AC Voltage with the desired constant power value required for export into the local grid. AC power is exported via a transmission link to a power grid.

The inventor has shown that when the energy capture system is combined with a partial energy storage system, this can complement the operation of the OWC module, by eliminating the peaks and troughs in the output electrical power that is being produced and provide more of a constant output electrical power, which in turn is emitted via a control system to users connected to an electricity grid.

In further embodiments, the supercapacitors can also be used in conjunction with chemical batteries. Once the voltage is buffered, the electricity produced can be put through the inverter to supply AC power to the grid.

The apparatus disclosed herein has many advantages over convention power generation devices, as well as previous OWC technologies:

The turbine performance/efficiency for the expected pressure/flow characteristics can also be optimised;

The device can be mechanically isolated in storm conditions to prevent damage by shutting off the valves. Because of its robust construction, it will not become damaged in a storm;

The experimental performance of the Oscillating Water Column (OWC) apparatus exhibited very good energy harvesting capability over a wide range of wave frequencies, and gave a noticeable improvement in output compared to previous bidirectional OWCs;

The simpler and more efficient unidirectional air turbine that can be safely located well above the action of the waves and protected from the elements by a concrete caisson, to survive extreme conditions. An example device will measure 20 metres by 20 metres, and are 18 metres tall. Of this, only 8 metres projects above the waterline. The generation units will generally be located some distance from shore, in ten metres of water depth.

It is anticipated that farms (or arrays) of near-shore wave energy converters can be used. By using these devices as coastal breakwaters (or seawalls), thus providing both power and a sheltered harbour for the local community and industry while also realising significant cost-sharing and saving possibilities.

The only moving parts in the entire technology are the turbine and some simple off-the-shelf valves, all of which are well above the water line. There are no moving parts in or below the water. This means maintenance is only ever required to be performed on the easy-to-access regions well above the ocean. The operation of many other wave-energy devices takes place underwater, which leaves them exposed to the corrosive and damaging effects of saltwater and makes them difficult to maintain or repair. The turbine and the generator are kept above the waterline, meaning there is less maintenance and any servicing can be carried out without the need for scuba equipment.

Because there are no moving parts under water, this precludes injury to marine life. No oil or contaminants can be released.

The reliability and predictability of ocean waves is a huge advantage over solar and wind power. For example, many meteorological and surfing websites already accurately predict wave conditions as much as a week in advance-thus, this renewable source can be considered as complementary baseload power.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive. For example, the particular L-shaped form of the duct 10 shown in the drawings may be different, with the two conduits 12, 14 not necessarily orthogonal to one another. The one-way flap valves 38 may be different in size, shape and total number thereof. There may be more than one turbine 44 on any particular duct 10, and these may be housed and connected to the uppermost region 36 of the second conduit 14 by other means (for example, via pipes). The materials of construction of the duct 10, whilst typically made of concrete, can also be of other materials such as hard plastics or carbon fibre, and be anchored via the base 18 at the ocean shore. While reference has been made to wave generation from the sea or an ocean, wave generation can also occur from lakes, rivers and tidal pools, all of which are suitable for using the present method and apparatus.

The invention claimed is:

1. Apparatus for extracting energy from an oscillating working fluid, the apparatus comprising:
   a flow passage for the oscillating working fluid,
   a flow control device which is, at least in part, in fluid communication with the flow passage; and
   an energy conversion unit comprising a gas turbine which is, at least in part, in fluid communication with the flow passage, and an energy generation apparatus coupled to the gas turbine via an output inverter, the apparatus arranged so that, in use, the flow control device is selectively operable between:
   a first configuration in which the flow control device is open to allow a flow of the oscillating working fluid to exit the flow passage therethrough, and
   a second configuration in which the flow control device is arranged to restrict a flow of the oscillating working fluid therethrough, such that the oscillating working fluid enters the flow passage via the energy conversion unit, whereby in use, rotation of the gas turbine in response to the flow of the oscillating working fluid generates rotational torque, which in turn actuates operation of the energy generation apparatus to generate electrical energy;
   wherein the energy generation apparatus rotational speed is controlled by an active front end drive which is arranged in use to operate said energy generation apparatus at a speed which is lower than the speed possible if all of the rotational torque generated by the rotation of the gas turbine was transferred thereto, thereby resulting in the active front end drive achieving a regenerative braking condition, and in so doing, generating an electrical energy input for charging of a rechargeable energy storage device.

2. Apparatus as claimed in claim 1, wherein the flow control device changes the configuration of access to the flow passage in response to changes in pressure and/or direction of flow of the oscillating working fluid.

3. Apparatus as claimed in claim 1, wherein the flow control device is fully closable so as to facilitate the flow of working fluid solely via the energy conversion unit in the second configuration.

4. Apparatus as claimed in claim 1, wherein the flow of the oscillating working fluid bypasses the energy conversion unit in the first configuration.

5. Apparatus as claimed in claim 1, wherein in use the flow control device and the energy conversion unit respectively are configured to operate separately and sequentially, depending on whether the apparatus is operating in the first or second configurations.

6. Apparatus as claimed in claim 1, wherein the flow control device operates passively in movement between the first and second configurations in response to the flow of the oscillating working fluid.

7. Apparatus as claimed claim 1, wherein the flow control device comprises a closure element which is moveable to become open in the first configuration or closed in the second configuration.

8. Apparatus as claimed in claim 7, wherein the closure element is of a shape which covers an exit opening of the flow passage, and which is hingedly moveable in relation to said exit opening.

9. Apparatus as claimed in claim 8, wherein the closure element comprises a resiliently deformable elastomeric material.

10. Apparatus as claimed in claim 8, wherein the exit opening is arranged with one or more support elements which extend thereacross, arranged in use to support the closure element when in the closed position by restricting movement thereof into the flow passage when the apparatus is operating in the second configuration.

11. Apparatus as claimed in claim 1, wherein the gas turbine is disposed within a turbine housing, said turbine housing being arranged in use to be in fluid connection with the flow passage and to permit rotation of the gas turbine in response to changes in pressure and/or direction of flow of the oscillating working fluid in the second configuration.

12. Apparatus as claimed in claim 11, wherein the energy generation apparatus comprises an electrical motor to which the rotational torque generated by the gas turbine is transferred so as to drive the electrical motor in use.

13. Apparatus as claimed in claim 1, wherein the rechargeable energy storage device is one or more of the group comprising: DC Bus, battery and supercapacitor.

14. Apparatus as claimed in claim 13, wherein the electrical energy stored in the rechargeable energy storage device is discharged in use to elevate an output power level of the apparatus when the gas turbine is operating in the first configuration so as to become comparable with an output power level of the apparatus when the gas turbine is operating in the second configuration, to maintain output power from the apparatus at a desired constant value.

15. Apparatus as claimed in claim 1, wherein the gas turbine includes a rotor comprising a central hub and a plurality of blades arranged about and extending from the periphery of the hub, the rotor being disposed within a turbine housing, whereby the shape of the blades and the orientation of the blades in relation to the hub facilitates unidirectional rotation of the rotor of the gas turbine in response to a unidirectional axial flow of oscillating working fluid through the turbine housing, in use.

16. Apparatus as claimed in claim 1, wherein the oscillating working fluid is air, and the flow of the air is generated by oscillations of an oscillating water column which is in fluid communication with the flow passage in use, and which is located within a duct.

17. Apparatus as claimed in claim 16, in which the duct comprises an internal channel arranged to extend within a housing which is positioned in use at least partially in a body of water having waves, such that the oscillating water column is established within the duct as a result of repeated movement of water into and out of the duct from an incoming and outgoing flow of the waves, the flow of water received into the duct being from an incoming wave, and the flow of water out of the duct is in a direction opposite to the direction of the incoming wave; and wherein a change in pressure and/or direction of flow of the air both into and out of the flow passage is responsive to, and generated by, oscillations of the oscillating water column in the duct.

18. Apparatus as claimed in claim 17, wherein the duct comprises:
   a. a first portion arranged in use to be substantially submerged below the mean surface level (MSL) of the body of water in which the first portion is located, the first portion having an opening arranged for receiving the incoming wave from the body of water, and
   b. a second portion which depends from the first portion and which is arranged in use to extend above the MSL, the second portion for receiving water from the incoming wave after the incoming wave flows through the first portion,
   wherein the flow passage is defined by a region of the second portion which extends above a maximum level of water received from the incoming wave after the incoming wave flows through the first portion.

19. Apparatus as claimed in claim 18, wherein the first and second portions of the duct are joined via a flow direction control segment intermediate the first and second portions, the flow direction control segment is defined by a planar sloped portion arranged at the junction of and extending between the first and second portions.

20. Apparatus as claimed in claim 18, wherein the first and second portions of the duct are generally elongate conduits, the first portion having a cross-sectional area greater than the cross-sectional area of the second portion.

21. Apparatus as claimed in claim 20, wherein the cross-sectional area at the opening of first portion is of a greater cross-sectional area than the remainder of the first portion, the conduit tapering down in cross-sectional area when moving in a direction from an outer entry mouth region at the opening toward the second portion, so as to accelerate the flow of incoming waves from the body of water into the duct.

22. Apparatus as claimed in claim 21, wherein the outer entry mouth region of the first portion is arranged in use to extend above the MSL of the body of water in which the first portion is located, so as to capture a greater flow of incoming waves from the body of water into the duct.

23. Apparatus as claimed in claim 22, wherein the base of the housing is arranged to have a downwardly sloping exterior when moving in a direction toward a mouth end (open end) of the first conduit, and arranged in use so that the housing operably rests on a base bed in the body of water in which the housing is disposed.

24. A method of extracting energy from an oscillating working fluid, the method including the steps of:
   (i) positioning a housing at least partially in a body of water having waves, the housing defining a flow passage for receiving the oscillating working fluid;
   (ii) arranging an energy conversion unit comprising a gas turbine to be in fluid communication with the oscillating working fluid, and arranging an energy generation apparatus which is coupled to the gas turbine via an output inverter; and
   (iii) providing flow control device for selectively changing the configuration of the flow passage between:
      an active configuration such that the oscillating working fluid acts on the energy conversion unit when flowing in a first predetermined direction, whereby in use, rotation of the gas turbine in response to the flow of the oscillating working fluid generates rotational torque, which in turn actuates operation of the energy generation apparatus to generate electrical energy; and
      a bypass configuration in which the oscillating working fluid bypasses the energy conversion unit when flowing in a second direction,
   (iv) providing an active front end drive to operatively control the rotational speed of the energy generation apparatus to be lower than the speed possible if all of the rotational torque generated by the rotation of gas turbine was transferred thereto, to result in the active front end drive achieving a regenerative braking condition, and in so doing, generating an electrical energy input for charging of a rechargeable energy storage device.

25. The method as claimed in claim 24, wherein changing the configuration of the flow passage between the active configuration and the bypass configuration occurs when the flow control device and the energy conversion unit are configured to operate in separate and sequential steps, in which a flow of oscillating working fluid exits the flow passage via the flow control device, and a flow of oscillating working fluid enters the flow passage via the energy conversion unit.

26. The method as claimed in claim 24, wherein the housing is arranged to contain an oscillating water column (OWC) located adjacent the body of water with waves, wherein the direction of the oscillating working fluid acting on the energy conversion unit is associated with the fall of a passing wave and a fall of the OWC, and the direction of the oscillating working fluid acting on the flow control device is associated with the rise of a passing wave and a rise of the OWC.

\* \* \* \* \*